(12) United States Patent
Islam et al.

(10) Patent No.: US 10,938,545 B2
(45) Date of Patent: Mar. 2, 2021

(54) SYNCHRONIZATION SIGNAL TRANSMISSION TECHNIQUES FOR PEAK-TO-AVERAGE POWER RATIO REDUCTION

(71) Applicant: QUALCOMM Incorporated, San Diego, CA (US)

(72) Inventors: Muhammad Nazmul Islam, Edison, NJ (US); Navid Abedini, Raritan, NJ (US); Juergen Cezanne, Ocean Township, NJ (US); Sundar Subramanian, Bridgewater, NJ (US); Bilal Sadiq, Basking Ridge, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 15/713,225

(22) Filed: Sep. 22, 2017

(65) Prior Publication Data

US 2018/0139036 A1      May 17, 2018

Related U.S. Application Data

(60) Provisional application No. 62/421,630, filed on Nov. 14, 2016.

(51) Int. Cl.
*H04L 12/00* (2006.01)
*H04L 7/04* (2006.01)
(Continued)

(52) U.S. Cl.
CPC ............... *H04L 7/041* (2013.01); *H04J 1/02* (2013.01); *H04L 5/0048* (2013.01);
(Continued)

(58) Field of Classification Search
None
See application file for complete search history.

(56) References Cited

U.S. PATENT DOCUMENTS 9,473,229 B2  10/2016  Yin et al.
2015/0016337 A1  1/2015  Chung et al.
(Continued)

OTHER PUBLICATIONS

Han D.G., et al., "Efficient Preamble Design Technique for Millimeter-Wave Cellular Systems with Beamforming", 10.3390/s16071129, vol. 16, No. 7, Jul. 2016, pp. 1-15.
(Continued)

*Primary Examiner* — Noel R Beharry
*Assistant Examiner* — Lionel Preval
(74) *Attorney, Agent, or Firm* — Holland & Hart LLP

(57) ABSTRACT

Methods, systems, and devices for wireless communication are described. Synchronization signals may be transmitted using a set of phase offsets over different component carriers or using a single component carrier for each antenna port. For example, a base station may identify a set of synchronization signals (e.g., a set of primary synchronization signals (PSSs)) to be transmitted over one or multiple component carriers. In some cases, each PSS may be associated with a different component carrier, and the base station may apply a different phase offset to each PSS when transmitting the set of PSSs on the component carriers. In some examples, the base station may transmit the PSSs on the component carriers using a different antenna port for each component carrier.

19 Claims, 16 Drawing Sheets

(51) Int. Cl.

| | |
|---|---|
| *H04L 5/00* | (2006.01) |
| *H04L 27/26* | (2006.01) |
| *H04J 1/02* | (2006.01) |
| *H04W 52/36* | (2009.01) |
| *H04W 56/00* | (2009.01) |

(52) U.S. Cl.
CPC ......... *H04L 27/2614* (2013.01); *H04W 52/36* (2013.01); *H04W 56/001* (2013.01); *H04L 5/001* (2013.01); *H04L 27/2621* (2013.01); *Y02D 30/70* (2020.08)

(56) References Cited

U.S. PATENT DOCUMENTS

| | | | |
|---|---|---|---|
| 2017/0034812 A1* | 2/2017 | Deng | H04W 72/046 |
| 2017/0171865 A1* | 6/2017 | Hwang | H04B 1/713 |
| 2017/0223652 A1* | 8/2017 | Ko | H04W 56/0035 |

OTHER PUBLICATIONS

Morelli M., et al., "A Robust Scheme for PSS Detection and Integer Frequency Offset Recovery in LTE Systems", arXiv:1505.02950v1 [cs.IT], May 12, 2015, pp. 1-10.
International Search Report and Written Opinion—PCT/US2017/053240—ISA/EPO—dated Feb. 16, 2018.
Partial International Search Report—PCT/US2017/053240—ISA/EPO—dated Nov. 29, 2017.
Qualcomm Inc: "Multi-beam SYNC Design", 3GPP TSG RAN WG1 Meeting #87; R1-1612024, 3rd Generation Partnership Project (3GPP), Mobile Competence Centre; 650, Route Des Lucioles; F-06921 Sophia-Anti Polis Cedex; France, vol. RAN WG1, No. Reno, Nevada, USA, Nov. 14-18, 2016, pp. 1-10, XP051175986, Retrieved from the Internet: URL:http://www.3gpp.org/ftp/Meetings_3GPP_SYNC/RAN1/Docs/ [retrieved on Nov. 13, 2016].
Qualcomm Incorporated: "Multi-Beam SYNC design", 3GPP Draft; R1-1610159, 3rd Generation Partnership Project (3GPP), Mobile Competence Centre; 650, Route Des Lucioles; F-06921 Sophia-Anti Polis Cedex; France, vol. RAN WG1, No. Lisbon, Portugal; Oct. 9, 2016, XP051150182, Retrieved from the Internet: URL:http://www.3gpp.org/ftp/Meetings_3GPP_SYNC/RAN1/Docs/ [retrieved on Oct. 9, 2016], 9 pages
Qualcomm Incorporated: "Multiplexing of Waveforms for SYNC", 3GPP Draft; R1-1612026, 3rd Generation Partnership Project (3GPP), Mobile Competence Centre; 650, Route Des Lucioles; F-06921 Sophia-Anti Polis Cedex; France, vol. RAN WG1, No. Reno, Nevada, USA; Nov. 13, 2016, XP051175988, Retrieved from the Internet: URL:http://www.3gpp.org/ftp/Meetings_3GPP_SYNC/RAN1/Docs/ [retrieved on Nov. 13, 2016], 9 pages.
Qualcomm Incorporated: "Time Accuracy for Contiguous Carrier Aggregation", 3GPP Draft; R4-103053, 3rd Generation Partnership Project (3GPP), Mobile Competence Centre; 650, Route Des Lucioles; F-06921 Sophia-Anti Polis Cedex; France, vol. RAN WG4, No. Madrid, Spain; Aug. 17, 2010, XP050454142, [retrieved on Aug. 17, 2010], 2 pages.
Texas Instruments: "Resolving CM and Cell ID Issues Associated with Aggregated Carriers," R1-091839, 3rd Generation Partnership Project (3GPP), Mobile Competence Centre; 650, Route Des Lucioles; F-06921 Sophia-Anti Polis Cedex; France, No. San Francisco, USA; Apr. 28, 2009, XP050339341, [retrieved on Apr. 28, 2009], 2 pages.

* cited by examiner

//www.freepatentsonline.com/10938545.html

SYNCHRONIZATION SIGNAL TRANSMISSION TECHNIQUES FOR PEAK-TO-AVERAGE POWER RATIO REDUCTION

CROSS REFERENCES

The present Application for Patent claims priority to U.S. Provisional Patent Application No. 62/421,630 by Islam, et al., entitled "Synchronization Signal Transmission Techniques For Peak-To-Average Power Ratio Reduction," filed Nov. 14, 2016, assigned to the assignee hereof, and is hereby expressly incorporated by reference herein in its entirety.

BACKGROUND

The following relates generally to wireless communication at a base station, and more specifically to synchronization signal transmission techniques for peak-to-average power ratio (PAPR) reduction.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communications networks may operate using millimeter wave (mmW) spectrum that may be associated with greater path loss for transmitted signals. In such cases, beamforming may be used to increase the strength of wireless signals, including signals that are broadcast from a base station and used by a UE. However, various transmission configurations may affect power ratios associated with certain signals, and it may be desirable to implement techniques related to such signals.

SUMMARY

The described techniques relate to improved methods, systems, devices, or apparatuses that support synchronization signal transmission techniques for peak-to-average power ratio (PAPR) reduction. Generally, the described techniques provide for the transmission of synchronization signals using a set of phase offsets that are simultaneously transmitted using frequency division multiplexing (FDM). The described techniques also provide for the transmission of synchronization signal blocks, where each synchronization signal block is transmitted on one or more component carriers or transmitted simultaneously on a wideband carrier. For example, a base station may identify a set of synchronization signals (e.g., a set of primary synchronization signals (PSSs)) to be transmitted over one or more component carriers. In some cases, each PSS may be associated with a different component carrier, and the base station may apply a different phase offset to each PSS when transmitting the set of PSSs on the different component carriers. In some examples, the base station may transmit the synchronization signal blocks on the component carriers using a different antenna port for each component carrier.

A method of wireless communication is described. The method may include identifying a set of synchronization signals, selecting a phase offset from a set of phase offsets for each synchronization signal of the set of synchronization signals, and transmitting the set of synchronization signals using the selected phase offsets, the set of synchronization signals being simultaneously transmitted using frequency division multiplexing.

An apparatus for wireless communication is described. The apparatus may include means for identifying a set of synchronization signals, means for selecting a phase offset from a set of phase offsets for each synchronization signal of the set of synchronization signals, and means for transmitting the set of synchronization signals using the selected phase offsets, the set of synchronization signals being simultaneously transmitted using frequency division multiplexing.

Another apparatus for wireless communication is described. The apparatus may include a processor, memory in electronic communication with the processor, and instructions stored in the memory. The instructions may be operable to cause the processor to identify a set of synchronization signals, select a phase offset from a set of phase offsets for each synchronization signal of the set of synchronization signals, and transmit the set of synchronization signals using the selected phase offsets, the set of synchronization signals being simultaneously transmitted using frequency division multiplexing.

A non-transitory computer readable medium for wireless communication is described. The non-transitory computer-readable medium may include instructions operable to cause a processor to identify a set of synchronization signals, select a phase offset from a set of phase offsets for each synchronization signal of the set of synchronization signals, and transmit the set of synchronization signals using the selected phase offsets, the set of synchronization signals being simultaneously transmitted using frequency division multiplexing.

In some examples of the method, apparatus, and non-transitory computer-readable medium described above, transmitting the set of synchronization signals comprises: transmitting each synchronization signal on one or more component carriers of a set of component carriers. In some examples of the method, apparatus, and non-transitory computer-readable medium described above, transmitting each synchronization signal on the one or more component carriers comprises: transmitting each synchronization signal on different component carriers of the set of component carriers, each synchronization signal associated with a different component carrier of the set of component carriers.

In some examples of the method, apparatus, and non-transitory computer-readable medium described above, transmitting each synchronization signal on the different component carriers comprises: transmitting each synchronization signal in a different radio frequency band. In some examples of the method, apparatus, and non-transitory computer-readable medium described above, transmitting the set of synchronization signals comprises: transmitting the set of synchronization signals simultaneously in a frequency domain within a wideband carrier.

In some examples of the method, apparatus, and non-transitory computer-readable medium described above, the set of synchronization signals comprises PSSs, or secondary synchronization signals (SSSs), or a combination thereof.

Some examples of the method, apparatus, and non-transitory computer-readable medium described above may further include processes, features, means, or instructions for multiplexing each PSS and each SSS of the set of synchronization signals using time division multiplexing.

In some examples of the method, apparatus, and non-transitory computer-readable medium described above, selecting the phase offset comprises: applying a phase ramp across the set of synchronization signals, each synchronization signal being associated with different component carriers of a set of component carriers. In some examples of the method, apparatus, and non-transitory computer-readable medium described above, selecting the phase offset comprises: applying a sequence across different component carriers of a set of component carriers. In some examples of the method, apparatus, and non-transitory computer-readable medium described above, the sequence comprises a short Zadoff-Chu sequence, or an extended Zadoff-Chu sequence, or a short maximum length (M) sequence, or an extended M sequence.

Some examples of the method, apparatus, and non-transitory computer-readable medium described above may further include processes, features, means, or instructions for identifying the set of phase offsets based at least in part on a number of component carriers of a set of component carriers, or a sequence of synchronization signals associated with different component carriers of the set of component carriers, or both. Some examples of the method, apparatus, and non-transitory computer-readable medium described above may further include processes, features, means, or instructions for identifying a PAPR or a cubic metric (CM) associated with the set of phase offsets, wherein identifying the set of phase offsets may be based at least in part on minimizing the identified PAPR or the identified CM.

Some examples of the method, apparatus, and non-transitory computer-readable medium described above may further include processes, features, means, or instructions for identifying a PAPR or a CM associated with the set of phase offsets, wherein identifying the set of phase offsets may be based at least in part on whether the identified PAPR or the identified CM may be less than a predetermined threshold. Some examples of the method, apparatus, and non-transitory computer-readable medium described above may further include processes, features, means, or instructions for selecting one or more sequences for the set of synchronization signals. In some examples of the method, apparatus, and non-transitory computer-readable medium described above, the one or more sequences comprise a Zadoff-Chu sequence, or a M sequence, or a combination thereof.

In some examples of the method, apparatus, and non-transitory computer-readable medium described above, selecting the one or more sequences comprises: selecting one or more combinations of a root and a cyclic shift of a Zadoff-Chu sequence that minimizes a PAPR or a CM. Some examples of the method, apparatus, and non-transitory computer-readable medium described above may further include processes, features, means, or instructions for selecting one or more combinations of a polynomial and a cyclic shift of a M sequence that minimized the PAPR or the CM.

In some examples of the method, apparatus, and non-transitory computer-readable medium described above, selecting the one or more sequences comprises: selecting one or more combinations of a root and a cyclic shift of a Zadoff-Chu sequence that corresponds to a PAPR value or a CM value that may be below a predetermined threshold. Some examples of the method, apparatus, and non-transitory computer-readable medium described above may further include processes, features, means, or instructions for selecting one or more combinations of a polynomial and a cyclic shift of an M sequence that corresponds to a PAPR value or a CM value that may be below a predetermined threshold.

Some examples of the method, apparatus, and non-transitory computer-readable medium described above may further include processes, features, means, or instructions for transmitting a synchronization signal block using the selected phase offsets, wherein the synchronization signal block comprises at least one or more of a PSS, an SSS, a physical broadcast channel (PBCH), and a demodulation reference signal (DMRS) of the PBCH.

A method of wireless communication is described. The method may include identifying a set of synchronization signal blocks and transmitting each synchronization signal block of the set of synchronization signal blocks, each synchronization signal block being transmitted on one or more component carriers of a set of component carriers or transmitted simultaneously on a wideband carrier.

An apparatus for wireless communication is described. The apparatus may include means for identifying a set of synchronization signal blocks and means for transmitting each synchronization signal block of the set of synchronization signal blocks, each synchronization signal block being transmitted on one or more component carriers of a set of component carriers or transmitted simultaneously on a wideband carrier.

Another apparatus for wireless communication is described. The apparatus may include a processor, memory in electronic communication with the processor, and instructions stored in the memory. The instructions may be operable to cause the processor to identify a set of synchronization signal blocks and transmit each synchronization signal block of the set of synchronization signal blocks, each synchronization signal block being transmitted on one or more component carriers of a set of component carriers or transmitted simultaneously on a wideband carrier.

A non-transitory computer readable medium for wireless communication is described. The non-transitory computer-readable medium may include instructions operable to cause a processor to identify a set of synchronization signal blocks and transmit each synchronization signal block of the set of synchronization signal blocks, each synchronization signal block being transmitted on one or more component carriers of a set of component carriers or transmitted simultaneously on a wideband carrier.

In some examples of the method, apparatus, and non-transitory computer-readable medium described above, transmitting each synchronization signal block comprises: transmitting each synchronization signal block using a different antenna port of the base station or using a same antenna port of the base station. Some examples of the method, apparatus, and non-transitory computer-readable medium described above may further include processes, features, means, or instructions for generating a synchronization signal block corresponding to the different antenna port. Some examples of the method, apparatus, and non-transitory computer-readable medium described above may further include processes, features, means, or instructions for transmitting the synchronization signal block in a different component carrier of the set of component carriers from the different antenna port.

In some examples of the method, apparatus, and non-transitory computer-readable medium described above, transmitting each synchronization signal block on the one or more component carriers comprises: transmitting each synchronization signal block on different component carriers of the set of component carriers, each synchronization signal block associated with a different component carrier of the set of component carriers.

In some examples of the method, apparatus, and non-transitory computer-readable medium described above, transmitting each synchronization signal block comprises: transmitting each synchronization signal block using a first beam configuration having a first width greater than a second width of a second beam configuration, the second beam configuration associated with transmitting a synchronization signal block over multiple component carriers of the set of component carriers from a same antenna port.

In some examples of the method, apparatus, and non-transitory computer-readable medium described above, the first beam configuration may be based at least in part on a plurality of beam directions. Some examples of the method, apparatus, and non-transitory computer-readable medium described above may further include processes, features, means, or instructions for identifying a first transmit power greater than a second transmit power, the second transmit power associated with transmitting a synchronization signal block over multiple component carriers of the set of component carriers from a same antenna port, wherein transmitting each synchronization signal block in the one or more component carriers of the set of component carriers includes using the first transmit power.

In some examples of the method, apparatus, and non-transitory computer-readable medium described above, each synchronization signal block comprises at least one or more of a PSS, an SSS, a PBCH, and a DMRS of the PBCH. Some examples of the method, apparatus, and non-transitory computer-readable medium described above may further include processes, features, means, or instructions for identifying an indication of an antenna port associated with different component carriers, or a selected transmission beam, or both, wherein transmitting the synchronization signal block comprises transmitting the indication. In some examples of the method, apparatus, and non-transitory computer-readable medium described above, transmitting each synchronization signal block comprises: refraining from transmitting another signal while transmitting each synchronization signal block.

DETAILED DESCRIPTION

Figure 1:
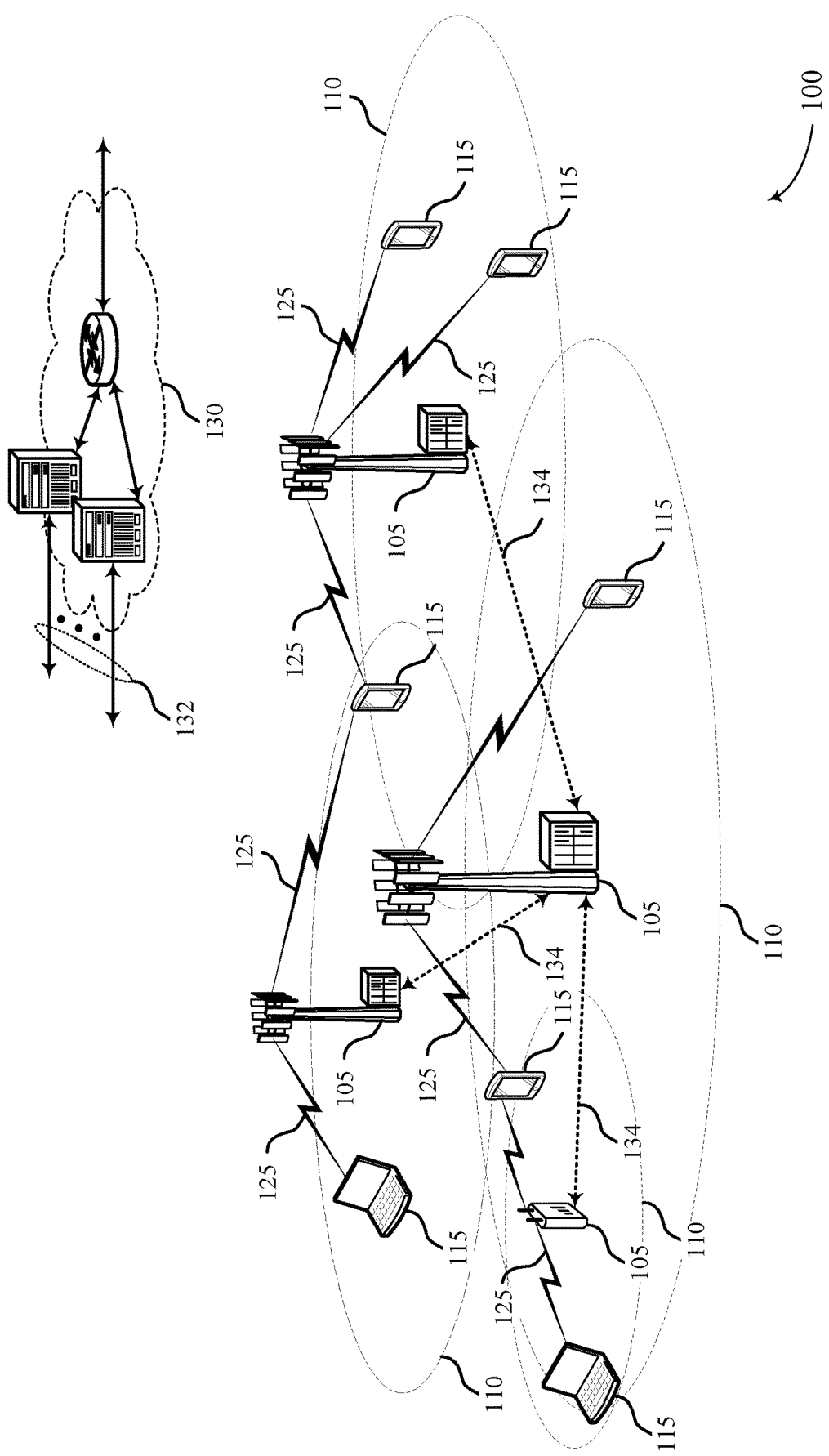
FIG. 1 illustrates an example of a system for wireless communication at a base station that supports synchronization signal transmission techniques for PAPR reduction in accordance with aspects of the present disclosure.

Some wireless communication systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies.

The transmission of synchronization signals and synchronization signal blocks by a base station (e.g., including primary synchronization signals (PSSs), secondary synchronization signals (SSSs), and physical broadcast channels (PBCHs)) may be utilized by a user equipment (UE) to synchronize its timing with the base station. Additionally, in wireless communications systems using mmW frequency ranges, synchronization signals may utilize beamforming techniques to meet a link budget. In such cases, a base station may use several antenna ports (e.g., 1, 2, 4, 8 antenna ports) connected to subarrays of antennas to form beams in various directions using a number of analog weight factors, and synchronization signals associated with the antenna ports may be transmitted in different directions. That is, the base station may sweep beams in multiple directions, where the synchronization signal may be transmitted for a relatively short duration in each direction.

Synchronization signals may be transmitted by a base station using time division multiplexing (TDM) or frequency division multiplexing (FDM), although TDM may, in some cases, be associated with a reduced peak-to-average power ratio (PAPR) of synchronization signals, such as PSSs. In some cases, if the PSS is transmitted using multiple component carriers (such as with the simultaneous transmission of PSS in multiple directions from different antenna ports) the reduction of PAPR for synchronization signals may not be maintained through the use of TDM alone. Accordingly, there may be techniques in which signals may be transmitted using TDM or FDM that reduce the PAPR (or cubic metric (CM)) of synchronization signals.

In some examples, a base station may use a selected set of phase offsets for the transmission of synchronization signals (e.g., PSSs) that are simultaneously transmitted using FDM, where a different phase offset may be applied to one or more synchronization signals transmitted on one or more component carriers. That is, a first synchronization signal transmitted in a first component carrier may be phase shifted (e.g., using a first phase offset) relative to a second synchronization signal transmitted in a second component carrier (e.g., using a second phase offset). The synchronization signal may then be transmitted during a symbol period on the one or more component carriers. For example, the synchronization signals may be transmitted on different component carriers or on the same component carrier. Additionally or alternatively, a base station may transmit a synchronization signal of a set of synchronization signals using only one component carrier for each transmit antenna port. For instance, PSSs from different antenna ports may be transmitted on different respective component carriers. The application of the phase offsets to PSSs transmitted over a set of component carriers and transmitting PSSs from different antenna ports on one or more component carriers may reduce the PAPR of the transmitted signal and provide other benefits. In some examples, synchronization signal blocks may be transmitted on the one or more component carries, or may be transmitted simultaneously on a wideband carrier. In such cases, the synchronization signal blocks may be transmitted using a same or different antenna port of the base station.

Aspects of the disclosure are initially described in the context of a wireless communications system. Further examples are then provided of synchronization signal transmission schemes. Aspects of the disclosure are further illustrated by and described with reference to apparatus diagrams, system diagrams, and flowcharts that relate to synchronization signal transmission techniques for PAPR reduction.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may be an example of a system that enables a sustained PAPR reduction when transmitting synchronization signals.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communications system 100 may operate in an ultra-high frequency (UHF) frequency region using frequency bands from 700 MHz to 2600 MHz (2.6 GHz), although in some cases wireless local area networks (WLANs) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

Wireless communications system 100 may support operation on multiple cells or carriers, a feature which may be referred to as carrier aggregation (CA) or multi-carrier operation. A carrier may also be referred to as a component carrier, a layer, a channel, etc. The terms "carrier," "component carrier," "cell," and "channel" may be used interchangeably herein. A UE 115 may be configured with multiple downlink component carriers and one or more uplink component carriers for carrier aggregation. Carrier aggregation may be used with both frequency division duplexed (FDD) and time division duplexed (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A UE 115 attempting to access a wireless network may perform an initial cell search by detecting a PSS from a base station 105. The PSS may enable synchronization of slot timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a physical hybrid automatic repeat request (HARD) indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring.

In some examples, synchronization signals that are transmitted using beamforming may be used to identify a best transmission and reception beam pair that meets a certain link budget (such as with a RACH Message-2). In some cases, synchronization signals in the frequency domain may be limited to a minimum bandwidth. For example, synchronization signal transmissions may be associated with a bandwidth between 35 MHz and 40 MHz. Additionally, orthogonal frequency division multiplexing (OFDM) symbols used for synchronization signals may not be frequency division multiplexed with other signals, which may support a full transmission power by a base station.

Wireless communications system 100 may support the transmission of synchronization signals using a set of phase offsets that are simultaneously transmitted using FDM. The described techniques also provide for the transmission of synchronization signal blocks, where each synchronization signal block is transmitted on one or more component carriers or transmitted simultaneously on a wideband carrier. For example, a base station 105 may identify a set of synchronization signals (e.g., a set of PSSs) to be transmitted over one or more component carriers. In some cases, each PSS may be associated with a different component carrier, and the base station 105 may apply a different phase offset to each PSS when transmitting the set of PSSs on the different component carriers. In some examples, the base station 105 may transmit the synchronization signal blocks on the component carriers using a different antenna port for each component carrier.

Figure 2:
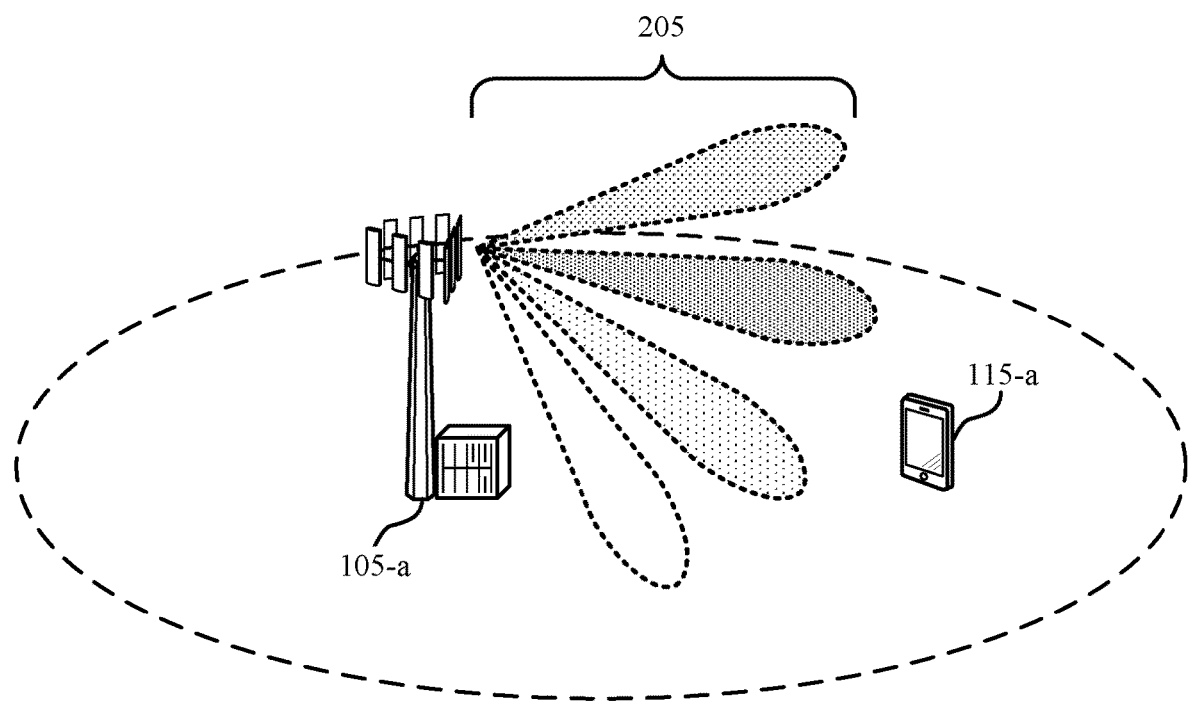
FIG. 2 illustrates an example of a wireless communications system that supports synchronization signal transmission techniques for PAPR reduction in accordance with aspects of the present disclosure.

FIG. 2 illustrates an example of a wireless communications system 200 for synchronization signal transmission techniques for PAPR reduction. Wireless communications system 200 may include a base station 105-*a* and a UE 115-*a*, which may be examples of the corresponding devices described with reference to FIG. 1. Wireless communications system 200 may be an example of the transmission of PSS from base station 105-*a* using a set of phase offsets. Additionally or alternatively, wireless communications system 200 may be an example of the transmission of PSS in one component carrier for each antenna port.

Wireless communications system 200 may be an example of a mmW communications system, and may accordingly use beamforming to overcome path loss within the system. The transmission of synchronization signals (e.g., PSSs, SSSs, PBCHs) from base station 105-*a* may be used by UE 115-*a* to synchronize its timing with base station 105-*a*. For instance, base station 105-*a* may use beams 205 to transmit synchronization signals in multiple directions, where different antenna ports of base station 105-*a* are used to transmit in the different directions. Additionally, the synchronization signals transmitted by base station 105-*a* may be swept through each direction, where the signals corresponding to different directions may be transmitted in different symbol periods (e.g., OFDM symbols). In some cases, base station 105-*a* may also refrain from multiplexing data with a PSS.

Synchronization signals may be transmitted by base station 105-*a* using TDM or FDM. However, if the PSS is transmitted using multiple component carriers, the reduction of PAPR for PSS may not be maintained solely through the use of TDM. As a result, there may be several techniques in which synchronization signals may be transmitted by base station 105-*a* using FDM that reduce the PAPR (or a cubic metric (CM)) of synchronization signals.

In some examples, base station 105-*a* may use a set of phase offsets for the transmission of synchronization signals sent simultaneously in an FDM manner, where a different phase offset is applied to synchronization signals transmitted on one or more component carriers. For example, a first PSS transmitted in a first component carrier may be phase shifted relative to a second PSS in a second component carrier, where the PSSs may be simultaneously transmitted in the different component carriers. Accordingly, the application of the phase offsets to synchronization signals transmitted over a set of component carriers may reduce the PAPR of the transmitted signal. For example, a PAPR associated with the transmission of PSSs including the phase offset may be lower than the PAPR when PSSs are transmitted without the phase offset. In some cases, a component carrier may include PSS transmission for multiple antenna ports, where the antenna ports each transmit in different directions at the same time. Additionally or alternatively, the synchronization signals having different phase offsets may be transmitted in the frequency domain within a wideband carrier.

Base station 105-*a* may use a number of techniques for the application of phase offsets to synchronization signals transmitted across one or more component carriers. For example, a phase ramp may be applied across synchronization signals that are associated with different component carriers, or a phase ramp may be applied across synchronization signals that are associated with a same component carrier. In other examples, a sequence may also be used across different component carriers. For instance, a Zadoff-Chu or a maximum length (M) sequence may be applied across different component carriers. In such cases, a short Zadoff-Chu sequence or a short M sequence may be used across respective carriers. Additionally or alternatively, an extended Zadoff-Chu sequence or extended M sequence may be used across the different component carriers.

In some cases, base station 105-*a* may use different aspects of synchronization signal transmissions when determining the set of phase offsets. For example, the set of phase offsets base station 105-*a* selects may be based on the number of component carriers within a set of component carriers used to transmit the synchronization signal. The set of phase offsets may also be based on a sequence of synchronization signals. Additionally, the set of phase offsets may also be chosen such that the PAPR or a CM is minimized, or chosen such that the PAPR or CM is less than a threshold. Base station 105-*a* may determine the set of phase offsets based on a measurement of the PAPR or CM within wireless communications system 200. For example, base station 105-*a* may perform an initial measurement of PAPR, determine the set of phase offsets based on the measurement, and proceed to use the set of phase offsets going forward.

When transmitting the synchronization signals, base station 105-*a* may select a sequence to transmit the synchronization signals on the different component carriers. In such cases, the sequence used by base station 105-*a* (e.g., including a root and a cyclic shift, or a length of a base sequence) may be chosen to reduce the PAPR or CM within the system. For instance, a root and a cyclic shift (or the root and a base sequence length) of the Zadoff-Chu sequence may be chosen to minimize the PAPR or CM. Additionally or alternatively, the Zadoff-Chu sequence may be chosen so that the PAPR or CM of the system remains below a predetermined threshold. Similar techniques may be used for choosing an M sequence such that the PAPR or CM of the system is minimized or remains below a predetermined threshold. For instance, a polynomial and a cyclic shift, or combinations thereof, may be selected to minimize the PAPR or CM, or both.

In some cases, additional synchronization signals may be transmitted with the same phase offset as the PSS in each component carrier. For example, base station 105-*a* may transmit other synchronization signals (e.g., SSS and PBCH) using the same phase offset as the PSS in each component carrier. The SSS or PBCH in a given component carrier may therefore have a same phase offset relative to the PSS within that component carrier, and SSS and PBCH in other component carriers may have different phase offsets. However, in some cases, the additional synchronization signals may have a different phase offset than the transmitted PSS.

In some examples, base station 105-a may transmit a synchronization signal (e.g., PSS) using only one component carrier for each transmit antenna port. That is, PSSs from different antenna ports may be transmitted on respective component carriers. In such cases, the PAPR (or CM) for the PSS may be reduced, the transmission of a single Zadoff-Chu sequence for the PSS in each component carrier may be associated with a lower PAPR than when multiple Zadoff-Chu sequences are used for antenna ports transmitting PSS across multiple component carriers.

Each antenna port used to transmit the PSS in a single component carrier may also be associated with a wider beam 205. That is, an antenna port of base station 105-a may be transmitting in multiple directions (e.g., using different beams 205) during each symbol, and the beam 205 may be wider than when the antenna port is transmitting in a single direction or using a narrow beam 205. Additionally, each antenna port may have a boosted power to transmit the PSS, where the boosted power is greater than when the antenna port is transmitting PSS across multiple component carriers (e.g., in a single direction during each symbol). For example, the antenna port may only be using one of n component carriers for the PSS transmission, and therefore the transmit power for that antenna port may be boosted by a factor of n (e.g., due to the use of a wider beam 205). While the area gain may drop with the wider beam 205, the boosted transmit power may result in a receive power at UE 115-a that is the same as if a signal was transmitted using a single beam 205 over multiple component carriers.

In some cases, additional synchronization signals may be transmitted with the same configuration as the PSS transmission. That is, SSS and PBCH from each antenna port may also be transmitted in a single component carrier when PSS is transmitted in this manner. In some cases, this configuration of synchronization signals may indicate an antenna port associated with each component carrier, or may also indicate the choice of transmission beam 205.

Figure 3:
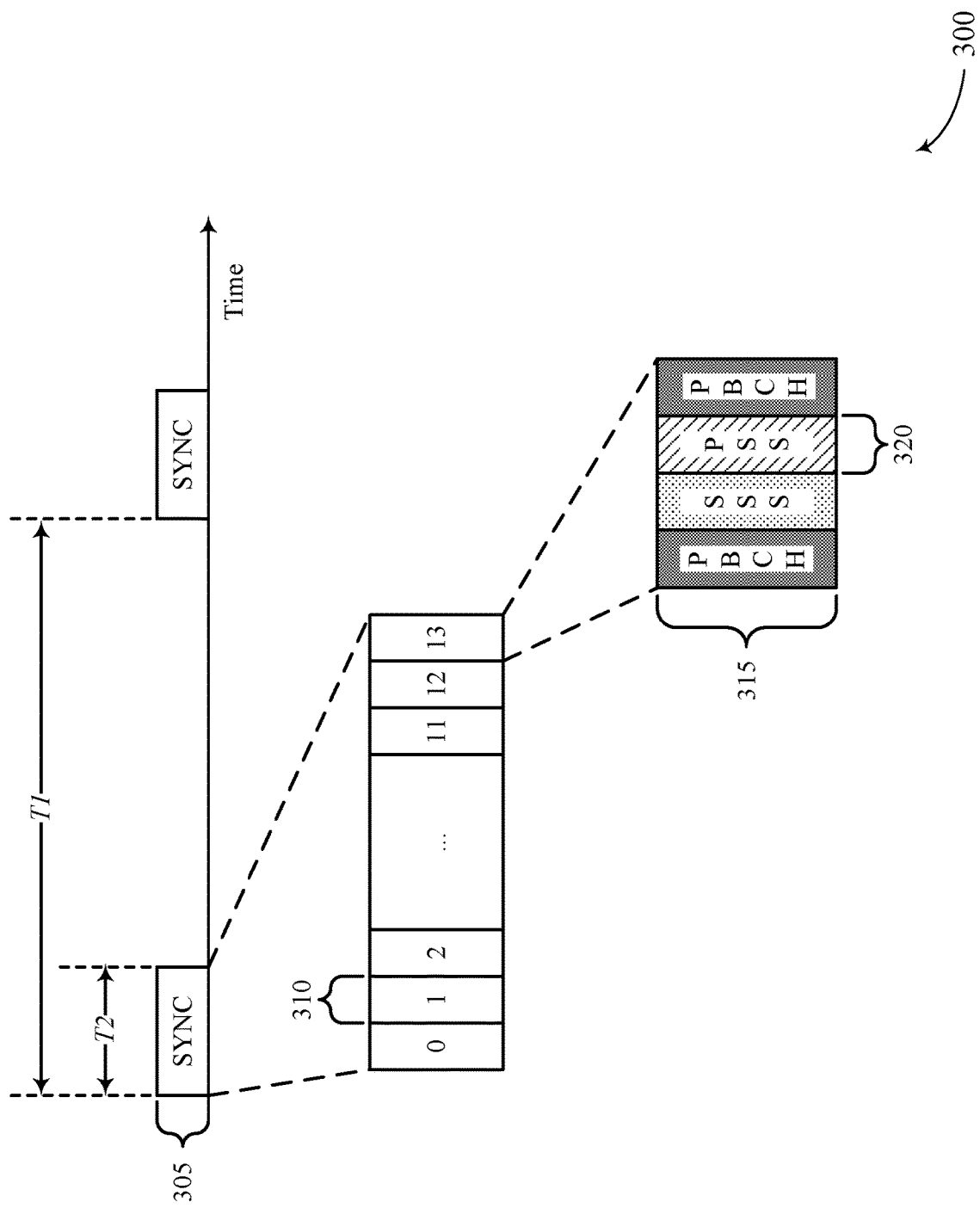
FIG. 3 illustrates an example of a synchronization signal block configuration that supports synchronization signal transmission techniques for PAPR reduction in accordance with aspects of the present disclosure.

FIG. 3 illustrates an example of a synchronization signal block configuration 300 for synchronization signal transmission techniques for PAPR reduction. The synchronization signal block configuration 300 may be used by a base station 105 to transmit synchronization signals (e.g., PSS, SSS, PBCH, etc.) to a UE 115. For example, synchronization signal block configuration 300 may include a number of synchronization signal bursts 305 that a UE 115 uses for initial access to a cell.

The synchronization signal bursts 305 may have a certain duration (e.g., T2) and may be transmitted periodically, where resources may be separated in the time domain by a certain period (e.g., T1). For example, a synchronization signal burst 305 may have a duration of 250 µs, and may be transmitted every 5 ms. Additionally, each synchronization signal burst 305 may include a multiple symbols 310 (e.g., 14 OFDM symbols) where resources for synchronization signals may be allocated.

For example, within a synchronization signal burst 305, multiple consecutive synchronization signal blocks 315 may be transmitted in the symbols 310. Each synchronization signal block may include a number of synchronization signals 320, which may include PSS, SSS, PBCH, or mobility reference signal (MRS), or a combination thereof. In some cases, each synchronization signal block 315 may be associated with a direction transmission of synchronization signals. That is, synchronization signal blocks 315 in each symbol 310 may be designated for a transmission in a different direction.

A synchronization signal block 315 may include synchronization signals 320 that are multiplexed according to TDM or FDM. For example, synchronization signal block 315 may include at least one or more PSS, SSS, and PBCH. In some cases, a PAPR of a PSS may improve with TDM (e.g., relative to FDM), where a Zadoff-Chu sequence or M sequence based synchronization signal may maintain a relatively lower PAPR if the PSS is not multiplexed with other signals. Additionally, PBCH demodulation may use the SSS as a reference (e.g., as compared to cases using dedicated reference tones), and may provide more efficient resource utilization.

Figure 4:
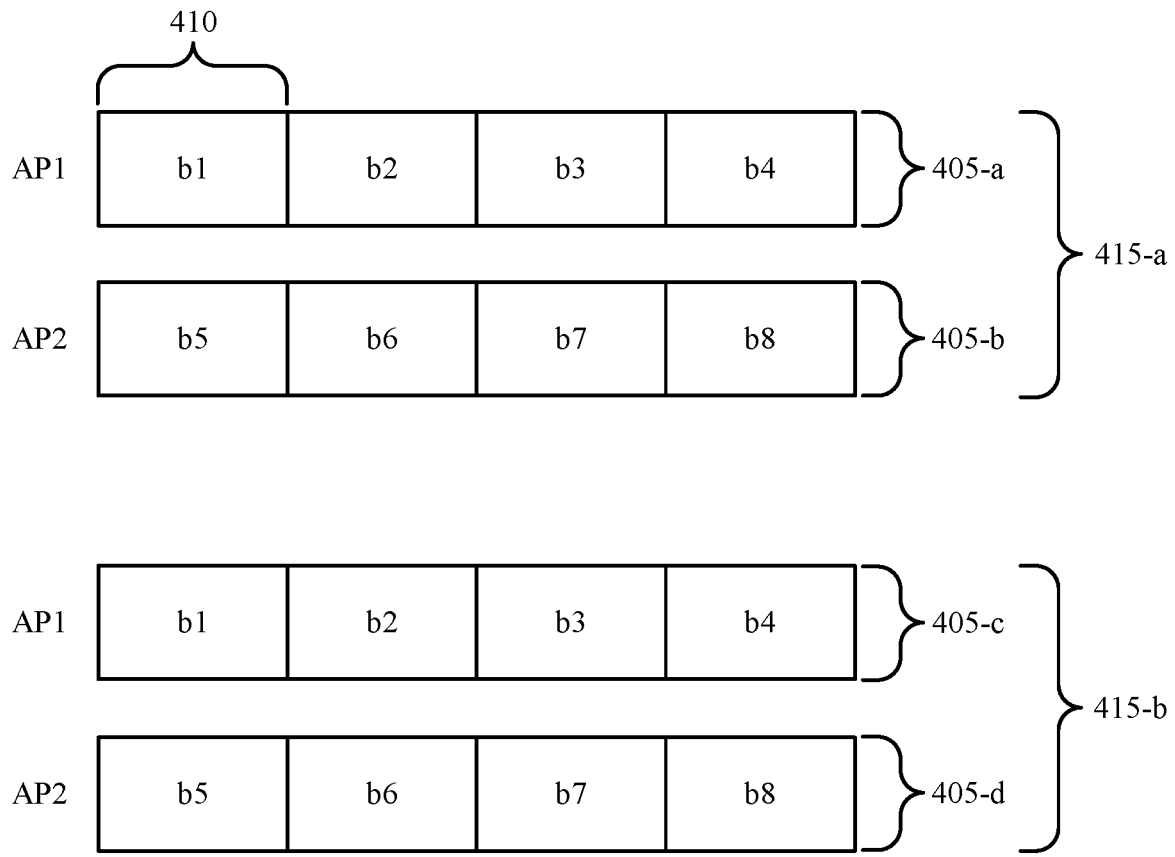
FIGS. 4 and 5 illustrate examples of transmission schemes that support synchronization signal transmission techniques for PAPR reduction in accordance with aspects of the present disclosure.

FIG. 4 illustrates an example of a transmission scheme 400 for synchronization signal transmission techniques for PAPR reduction. Transmission scheme 400 may be used by a base station 105 to broadcast synchronization signals in multiple directions, where each beam of an antenna port may be associated with a different direction. Additionally, transmission scheme 400 may be an example of different antenna ports transmitting synchronization signals across multiple component carriers using a set of phase offsets.

Transmission scheme 400 may include multiple antenna port transmissions 405 originating from different antenna ports of a base station 105. Each antenna port transmission 405 may include multiple symbols 410 that correspond to a transmission of synchronization signals using a different beam, where each beam (e.g., b1 through b8) may be associated with a different direction. For instance, a first antenna port transmission 405-a may include symbols 410 for four different beams (e.g., b1 through b4) from a first antenna port (AP1). Similarly, a second antenna port transmission 405-b may include symbols 410 for four different beams (e.g., b5 through b8) from a second antenna port (AP2).

In some examples, synchronization signals sent by each antenna port transmission 405 may use multiple component carriers 415 with a set of phase offsets applied to the synchronization signals across the component carriers 415. For example, the PSSs in the first antenna port transmission 405-a and the second antenna port transmission 405-b may be sent using a first component carrier 415-a. Additionally, PSSs sent in a third antenna port transmission 405-c and a fourth antenna port transmission 405-d may be included in a second component carrier 415-b. In the example of FIG. 4, the third antenna port transmission 405-c includes transmissions from the same beams as the first antenna port transmission 405-a. The same is illustrated with respect to the fourth antenna port transmission 405-d and the second antenna port transmission 405-b. The synchronization signals corresponding to a given beam may be simultaneously transmitted in a symbol 410 of different component carriers. Accordingly, transmission scheme 400 may illustrate the transmission of eight different beams for two different antenna ports (e.g., eight different directions for each antenna port) during four symbols 410.

As mentioned above, the synchronization signals transmitted in each component carrier 415 may use a set of phase offsets, where the synchronization signals for respective component carriers have a different phase offset. For instance, the first component carrier 415-a may include PSSs with a different phase offset from PSSs transmitted in the second component carrier 415-*b*. Other synchronization signals (e.g., SSS, PBCH, etc.) transmitted in the component carriers 415 may have a same phase offset as the PSSs transmitted in the respective component carrier 415. In some examples, the other synchronization signals may have a different phase offset.

Figure 5:
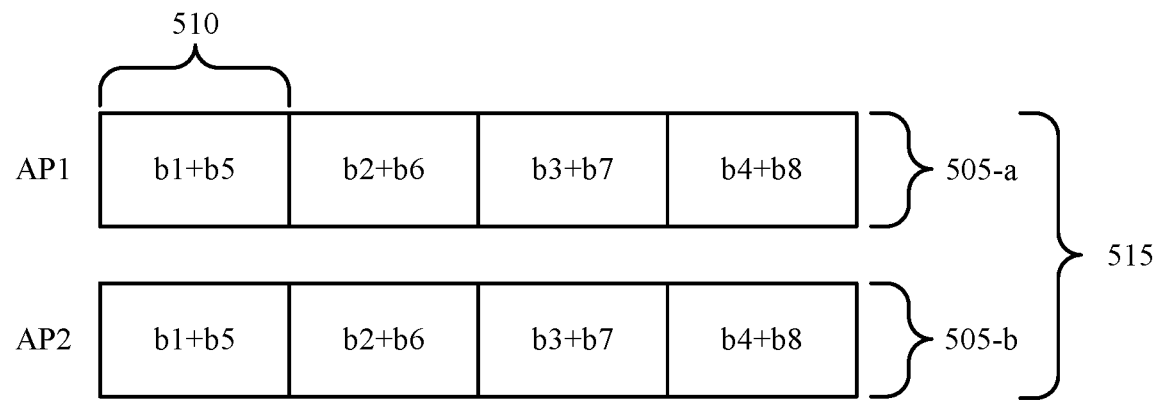

FIG. 5 illustrates an example of a transmission scheme 500 for synchronization signal transmission techniques for PAPR reduction. Transmission scheme 500 may be used by base station 105 to broadcast synchronization signals in multiple directions, where each beam of an antenna port may be associated with a different direction. Additionally, transmission scheme 500 may be an example of different antenna ports transmitting synchronization signals across multiple component carriers using a set of phase offsets.

Transmission scheme 500 may include multiple antenna port transmissions 505 originating from different antenna ports of base station 105. Each antenna port transmission 505 may include multiple symbols 510 that correspond to a transmission of synchronization signals using multiple beams, where each beam (e.g., b1 through b8) may be associated with a different direction. For instance, a first antenna port transmission 505-*a* may include four symbols 510 for eight different beams (e.g., b1 through b8) from a first antenna port (AP1), where each symbol 510 is associated with two different beams. Similarly, a second antenna port transmission 505-*b* may include four symbols 510 for eight different beams (e.g., b1 through b8) from a second antenna port (AP2).

Synchronization signals sent by each antenna port transmission 505 may use a single component carriers 515. For example, the PSSs in the first antenna port transmission 505-*a* and the second antenna port transmission 505-*b* may be sent using one component carrier 515. Accordingly, transmission scheme 500 may illustrate the transmission of eight different beams for two different antenna ports (e.g., eight different directions for each antenna port) across four symbols 510, but using a single component carrier 515.

In some cases, transmission scheme 500 may be associated with a relatively lower PAPR (e.g., as compared to the transmission scheme 400 as described with reference to FIG. 4). For instance, transmission scheme 500 may be used to transmit the PSS for a same number of beams within a same time interval as transmission scheme 400. Accordingly, a single Zadoff-Chu sequence may be used for PSS transmissions using transmission scheme 500, as compared to multiple Zadoff-Chu sequences used across multiple component carriers, which may lead to a reduced PAPR or reduced CM.

Figure 6:
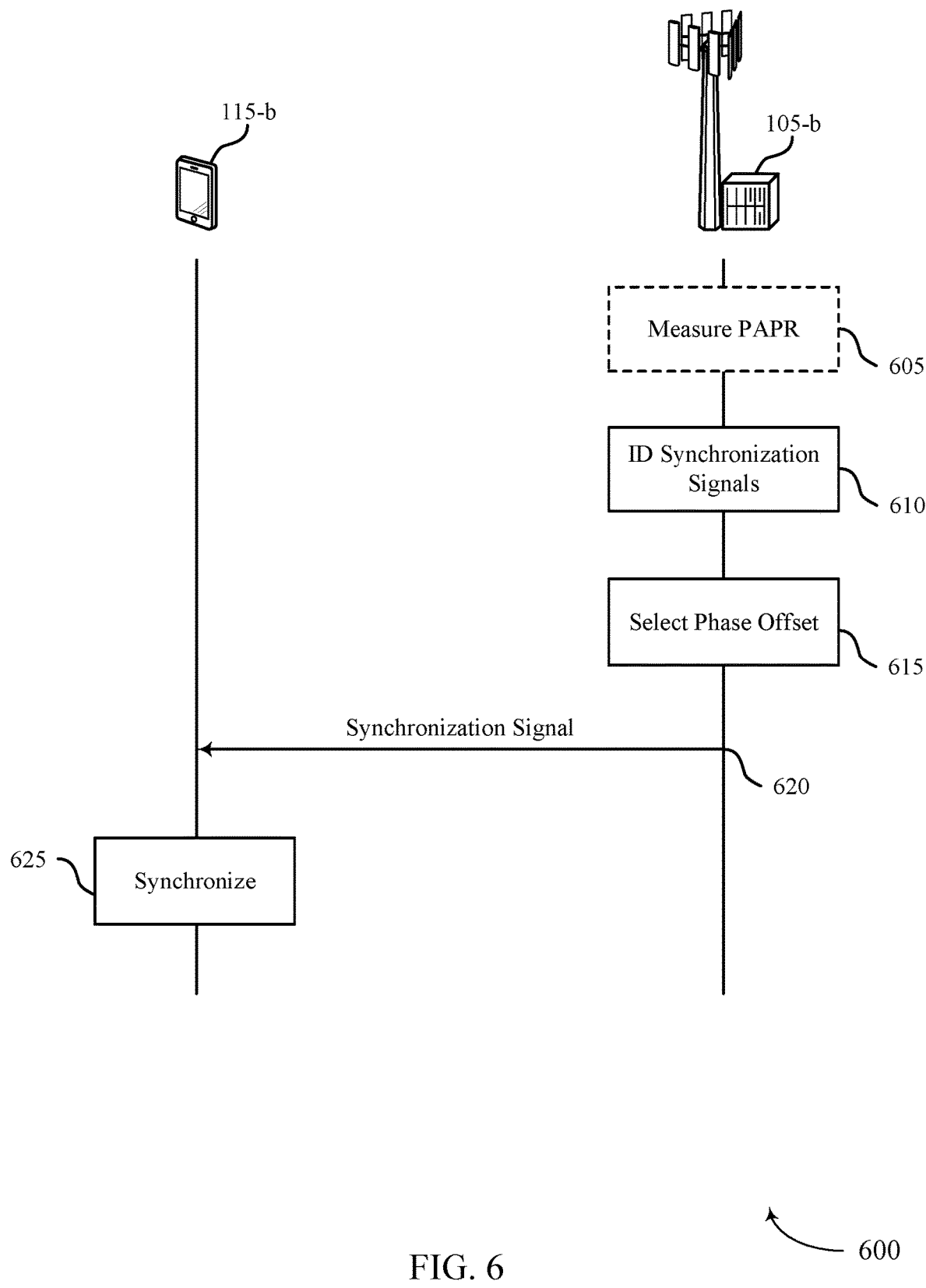
FIGS. 6 and 7 illustrates examples of process flows in a system that supports synchronization signal transmission techniques for PAPR reduction in accordance with aspects of the present disclosure.

FIG. 6 illustrates an example of a process flow 600 in a system that supports synchronization signal transmission techniques for PAPR reduction. Process flow 600 may include UE 115-*b* and base station 105-*b*, which may be examples of the corresponding devices described with reference to FIGS. 1 and 2. For example, base station 105-*b* and UE 115-*b* may operate in a mmW communications system. Process flow 600 may illustrate the application of a set of phases to synchronization signals transmitted across multiple component carriers.

At step 605, base station 105-*b* may optionally measure a current PAPR (or CM) within a system. In some examples, this measurement may be used to determine a set of phase offsets. Additionally or alternatively, this measurement may be a one-time measurement completed by base station 105-*b*.

At step 610, base station 105-*b* may identify a set of synchronization signals. For example, base station 105-*b* may identify a set of PSSs, where each PSS is associated with a different component carrier of a set of component carriers. In some cases, base station 105-*b* may identify a set of SSSs, and may multiplex each PSS and each SSS using TDM.

At step 615, base station 105-*b* may select a phase offset from a set of phase offsets for each synchronization signal of the set of synchronization signals. In some cases, the selection of the phase offset may include applying a phase ramp across the synchronization signal each associated with the different component carriers of the set of component carriers. Additionally or alternatively, selecting the phase offset includes applying a sequence, such as a short Zadoff-Chu sequence, an extended Zadoff-Chu sequence, a short M sequence, or an extended M sequence, across the different component carriers of the set of component carriers.

In some examples, base station 105-*b* may identify the set of phase offsets based at least in part on a number of component carriers of the set of component carriers, or a sequence of the synchronization signals associated with the different component carriers of the set of component carriers, or both. Base station 105-*b* may also identify a PAPR or a CM associated with the set of phase offsets. Accordingly, identifying the set of phase offsets may be based on minimizing the identified PAPR or the identified CM. In some cases, base station 105-*b* may identify the PAPR or the CM associated with the set of phase offsets, where identifying the set of phase offsets is based on whether the identified PAPR or the identified CM is less than a predetermined threshold.

At step 620, base station 105-*b* may transmit synchronization signals to UE 115-*b*. For example, base station 105-*b* may transmit each synchronization signal on the different component carriers of the set of component carriers using the selected phase offset. In some cases, the synchronization signals may be transmitted simultaneously using FDM. In some cases, base station 105-*b* may transmit a synchronization signal block using the selected phase offset, where the synchronization signal block comprises at least one or more of a PSS, an SSS, and a PBCH. That is, the transmission to UE 115-*b* at step 620 may include a number of different synchronization signals that may be multiplexed into a synchronization signal block (such as the synchronization signal block 315 described with reference to FIG. 3).

In some examples, transmitting each PSS on one or more component carriers includes transmitting each PSS in a different frequency band. Additionally, base station 105-*b* may select a Zadoff-Chu sequence for the PSS that are transmitted. In some cases, the selection of the Zadoff-Chu sequence may include selecting one or more combinations of a root and a cyclic shift or a base sequence length of the Zadoff-Chu sequence that minimizes a PAPR or a CM. The Zadoff-Chu sequence may also be selected such that the root and the cyclic shift of the Zadoff-Chu sequence corresponds to a PAPR value or a CM value that is below a predetermined threshold. In some examples, base station 105-*b* may not transmit another signal (e.g., such as another data signal) while transmitting each synchronization signal.

At step 625, UE 115-*a* may achieve synchronization with base station 105-*a* based on the received PSS, SSS, and PBCH. That is, UE 115-*a* may identify a radio frame, a subframe, a slot, and a symbol synchronization in the time domain, and may proceed with access procedures with base station 105-*a*.

Figure 7:
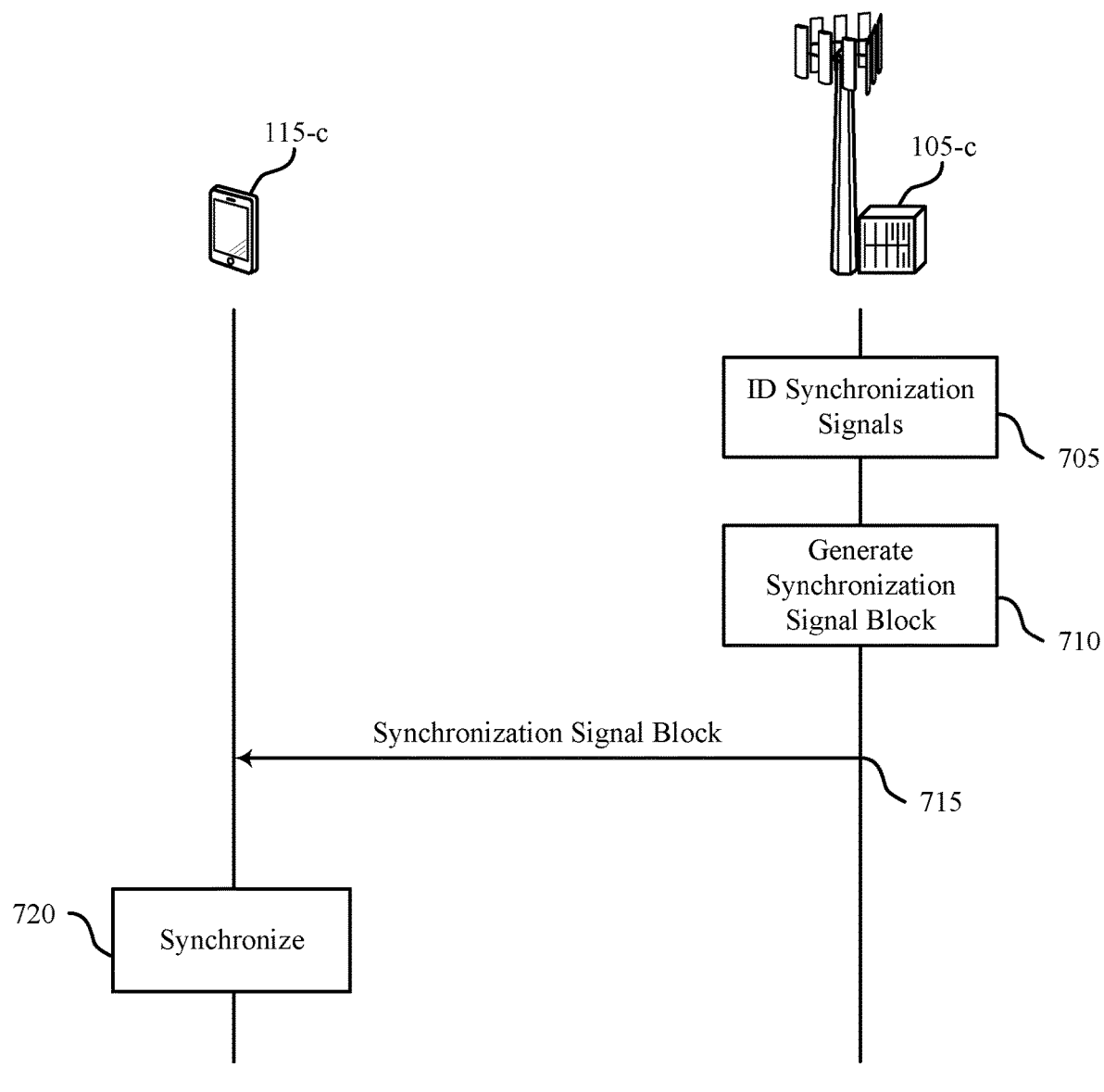

FIG. 7 illustrates an example of a process flow 700 in a system that supports synchronization signal transmission techniques for PAPR reduction. Process flow 700 may include a UE 115-*c* and a base station 105-*c*, which may be examples of the corresponding devices described with reference to FIGS. 1 and 2. For example, base station 105-*c* and UE 115-*c* may operate in a mmW communications system. Process flow 700 may illustrate the transmission of PSSs from different antenna ports of base station 105-*c* using a single component carrier for each antenna port.

At step 705, base station 105-*c* may identify synchronization signals to be broadcast to multiple UEs 115 (e.g., including UE 115-*c*). For example, a set of PSSs may be identified, where each PSS of the set of PSSs may be associated with a different component carrier of a set of component carriers. In some examples, each PSS of the set of PSSs is associated with a same PSS sequence.

At step 710, base station 105-*c* may generate a set of synchronization signal blocks (e.g., a synchronization signal block 315 as described with reference to FIG. 3), where the synchronization signal block may correspond to the different antenna ports. The synchronization signal block may include each PSS, SSS, PBCH, or a combination thereof.

At step 715, base station 105-*c* may transmit, and UE 115-*c* may receive the synchronization signal blocks. In some cases, the synchronization signals may be associated with directional transmission from base station 105-*c*. Transmitting the synchronization signal blocks may include transmitting each synchronization signal block in one or more component carriers of the set of component carriers using a different antenna port of base station 105-*c*. Additionally or alternatively, transmitting the synchronization signal blocks may include transmitting the synchronization signal blocks simultaneously on a wideband carrier. In some examples, base station 105-*c* may transmit the synchronization signal blocks in the different component carriers from respective antenna ports of base station 105-*c* (e.g., where each antenna port uses a single component carrier to transmit the synchronization signal block).

Transmitting the synchronization signal blocks may also include, for example, transmitting each synchronization signal block of the set of synchronization signal blocks using a relatively wider beam. For instance, base station 105-*c* may use a first beam configuration having a first width greater than a second width of a second beam configuration, where the second beam configuration may be associated with transmitting a synchronization signal block over multiple component carriers of the set of component carriers from a same antenna port (such as described with reference to FIGS. 1, 2, 4, and 6). In some cases, the first beam configuration may be based on multiple beam directions used by base station 105-*c*, where signals may be swept through the different directions.

Base station 105-*c* may also identify a first transmit power that is greater than a second transmit power, where the second transmit power is associated with transmitting a synchronization signal block over multiple component carriers of the set of component carriers from the same antenna port. As a result, base station 105-*c* may transmit each synchronization signal block on one or more component carriers of the set of component carriers from the different antenna ports using the first transmit power. In some cases, base station 105-*c* may identify an indication of an antenna port associated with the different component carriers, or a selected transmission beam, or both, and transmitting the synchronization signal block may include transmitting the indication. In some examples, base station 105-*c* may not transmit another signal while transmitting each synchronization signal block.

At step 720, UE 115-*c* may achieve synchronization with base station 105-*c* based on the received PSS, SSS, and PBCH. That is, UE 115-*c* may identify a radio frame, a subframe, a slot, and a symbol synchronization in the time domain, and may proceed with access procedures with base station 105-*c*.

Figure 8:
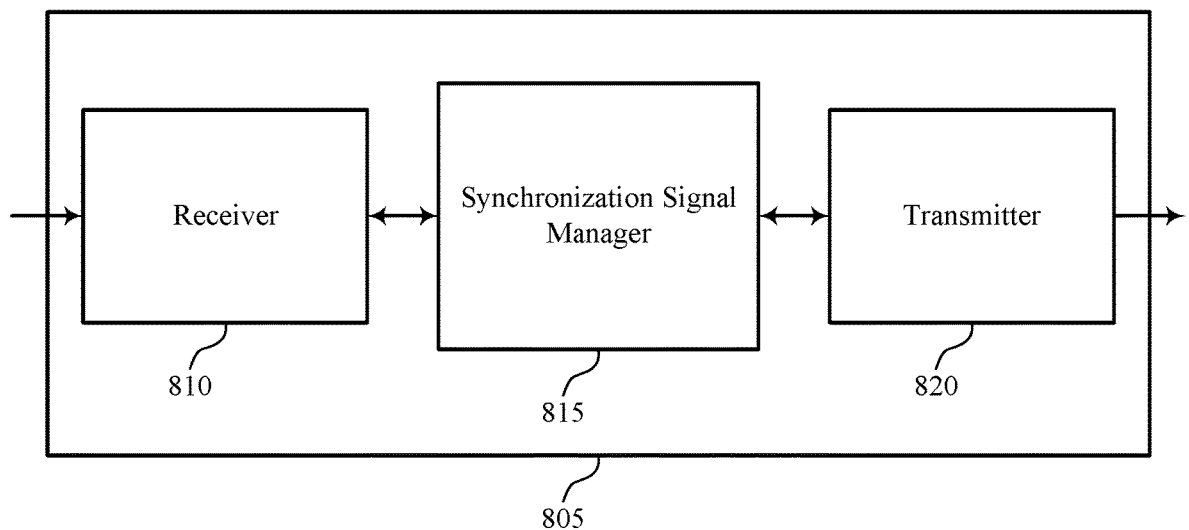
FIGS. 8 through 10 show block diagrams of a device that supports synchronization signal transmission techniques for PAPR reduction in accordance with aspects of the present disclosure.

FIG. 8 shows a block diagram 800 of a wireless device 805 that supports synchronization signal transmission techniques for PAPR reduction in accordance with various aspects of the present disclosure. Wireless device 805 may be an example of aspects of a base station 105 as described with reference to FIGS. 1 and 2. Wireless device 805 may include receiver 810, synchronization signal manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to synchronization signal transmission techniques for PAPR reduction, etc.). Information may be passed on to other components of the device. The receiver 810 may be an example of aspects of the transceiver 1135 described with reference to FIG. 11.

Synchronization signal manager 815 may be an example of aspects of the synchronization signal manager 1115 described with reference to FIG. 11. Synchronization signal manager 815 and/or at least some of its various sub-components may be implemented in hardware, software executed by a processor, firmware, or any combination thereof. If implemented in software executed by a processor, the functions of the synchronization signal manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The synchronization signal manager 815 and/or at least some of its various sub-components may be physically located at various positions, including being distributed such that portions of functions are implemented at different physical locations by one or more physical devices. In some examples, synchronization signal manager 815 and/or at least some of its various sub-components may be a separate and distinct component in accordance with various aspects of the present disclosure. In other examples, synchronization signal manager 815 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Synchronization signal manager 815 may identify a set of synchronization signals, where, in some cases, each synchronization signal of the set of synchronization signals may be associated with a different component carrier of a set of component carriers. Synchronization signal manager 815 may also select a phase offset from a set of phase offsets for each synchronization signal of the set of synchronization signals and transmit each synchronization signal using the selected phase offsets, the set of synchronization signals being simultaneously transmitted using FDM. In some examples, the synchronization signal manager 815 may identify a set of synchronization signal blocks and may transmit each synchronization signal block of the set of synchronization signal blocks. In such cases, each synchronization signal block may be transmitted on one or more component carriers of a set of component carriers or transmitted simultaneously on a wideband carrier.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
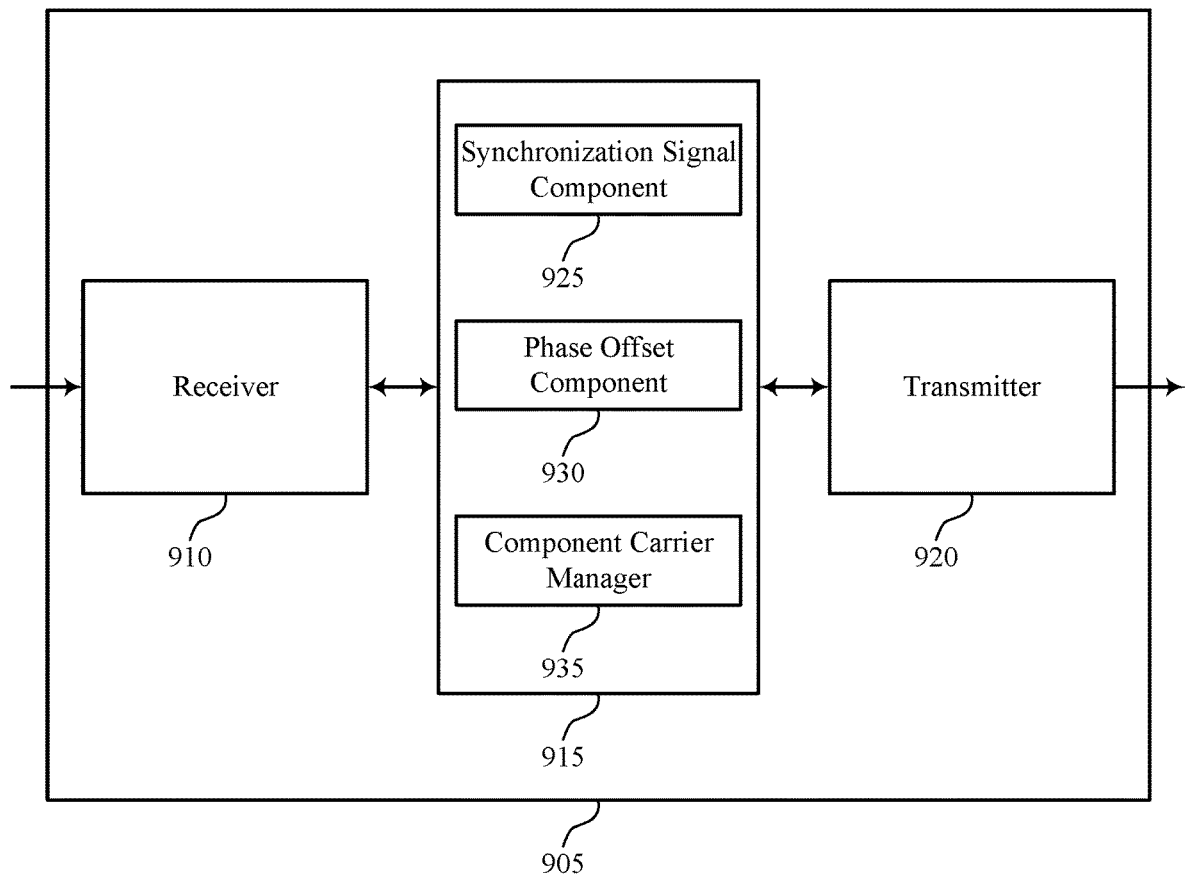

FIG. 9 shows a block diagram 900 of wireless device 905 that supports synchronization signal transmission techniques for PAPR reduction in accordance with various aspects of the present disclosure. Wireless device 905 may be an example of aspects of a wireless device 805 or a base station 105 (e.g., a base station that operates in mmW frequency spectrum) as described with reference to FIGS. 1 and 8. Wireless device 905 may include receiver 910, synchronization signal manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to synchronization signal transmission techniques for PAPR reduction, etc.). Information may be passed on to other components of the device. The receiver 910 may be an example of aspects of the transceiver 1135 described with reference to FIG. 11.

Synchronization signal manager 915 may be an example of aspects of the synchronization signal manager 1115 described with reference to FIG. 11. Synchronization signal manager 915 may also include synchronization signal component 925, phase offset component 930, and component carrier manager 935.

Synchronization signal manager 915 and/or at least some of its various sub-components may be implemented in hardware, software executed by a processor, firmware, or any combination thereof. If implemented in software executed by a processor, the functions of the synchronization signal manager 915 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure.

The synchronization signal manager 915 and/or at least some of its various sub-components may be physically located at various positions, including being distributed such that portions of functions are implemented at different physical locations by one or more physical devices. In some examples, synchronization signal manager 915 and/or at least some of its various sub-components may be a separate and distinct component in accordance with various aspects of the present disclosure. In other examples, synchronization signal manager 915 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Synchronization signal component 925 may identify a set of synchronization signals. In some cases, each synchronization signal may be associated with a different component carrier of a set of component carriers. In some examples, the set of synchronization signals includes PSSs, or SSSs, or a combination thereof. In some cases, each synchronization signal of the set of synchronization signal is associated with a same sequence. In some examples, synchronization signal component 925 may identify a set of synchronization signal blocks. In some cases, each synchronization signal block includes at least one or more of a PSS, a SSS, a PBCH, and a DMRS of the PBCH.

Phase offset component 930 may select a phase offset from a set of phase offsets for each synchronization signal of the set of synchronization signals and may identify the set of phase offsets based on a number of component carriers of the set of component carriers, or a sequence of the synchronization signals associated with the different component carriers of the set of component carriers, or both. In some examples, phase offset component 930 may identify a PAPR or a CM associated with the set of phase offsets, where identifying the set of phase offsets is based on minimizing the identified PAPR or the identified CM. Additionally or alternatively, phase offset component 930 may identify a PAPR or a CM associated with the set of phase offsets, where identifying the set of phase offsets is based on whether the identified PAPR or the identified CM is less than a predetermined threshold. In some cases, selecting the phase offset includes applying a phase ramp across the synchronization signals each associated with the different component carriers of the set of component carriers.

In some cases, selecting the phase offset includes applying a sequence across different component carriers of a set of component carriers. The sequence may include a short Zadoff-Chu sequence, or an extended Zadoff-Chu sequence, or a short M sequence, or an extended M sequence. In some examples, selecting the phase offset includes applying a short Zadoff-Chu sequence across the different component carriers of the set of component carriers. In some cases, selecting the phase offset includes applying an extended Zadoff-Chu sequence across the different component carriers of the set of component carriers.

Component carrier manager 935 may transmit each synchronization signal on one or more component carriers of a set of component carriers using the selected phase offset. In some examples, component carrier manager 935 may transmit the set of synchronization signals using the selected phase offsets, the set of synchronization signals being simultaneously transmitted using FDM. In some cases, transmitting the set of synchronization signals includes transmitting each synchronization signal on one or more component carriers of a set of component carriers. In some examples, transmitting each synchronization signal on the different component carriers includes transmitting each synchronization signal in a different radio frequency band. In some cases, transmitting the set of synchronization signals includes transmitting the set of synchronization signals simultaneously in a frequency domain within a wideband carrier.

Additionally or alternatively, component carrier manager 935 may transmit each synchronization signal block of the set of synchronization signal blocks, each synchronization signal block being transmitted on one or more component carriers of a set of component carriers or transmitted simultaneously on a wideband carrier. In some cases, transmitting each synchronization signal on one or more component carriers includes transmitting each synchronization signal in a different frequency band. In some cases, transmitting each synchronization signal includes transmitting each synchronization signal on different component carriers of a set of component carriers, where each synchronization signal may be associated with a different component carrier of the set of component carriers. In some cases, transmitting each PSS includes refraining from transmitting another signal while transmitting each synchronization signal. Additionally or alternatively, transmitting each synchronization signal includes refraining from transmitting a data signal while transmitting each synchronization signal.

In some examples, transmitting each synchronization signal block includes transmitting each synchronization signal block using a different antenna port of the base station or using a same antenna port of the base station. In some cases, transmitting each synchronization signal block on the one or more component carriers includes transmitting each synchronization signal block on different component carriers of the set of component carriers, each synchronization signal block associated with a different component carrier of the set of component carriers. In some examples, transmitting each synchronization signal block includes transmitting each synchronization signal block using a first beam configuration having a first width greater than a second width of a second beam configuration, the second beam configuration associated with transmitting a synchronization signal block over multiple component carriers of the set of component carriers from a same antenna port. In some cases, the first beam configuration is based at least in part on a plurality of beam directions. In some examples, transmitting each synchronization signal block includes refraining from transmitting another signal while transmitting each synchronization signal block.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
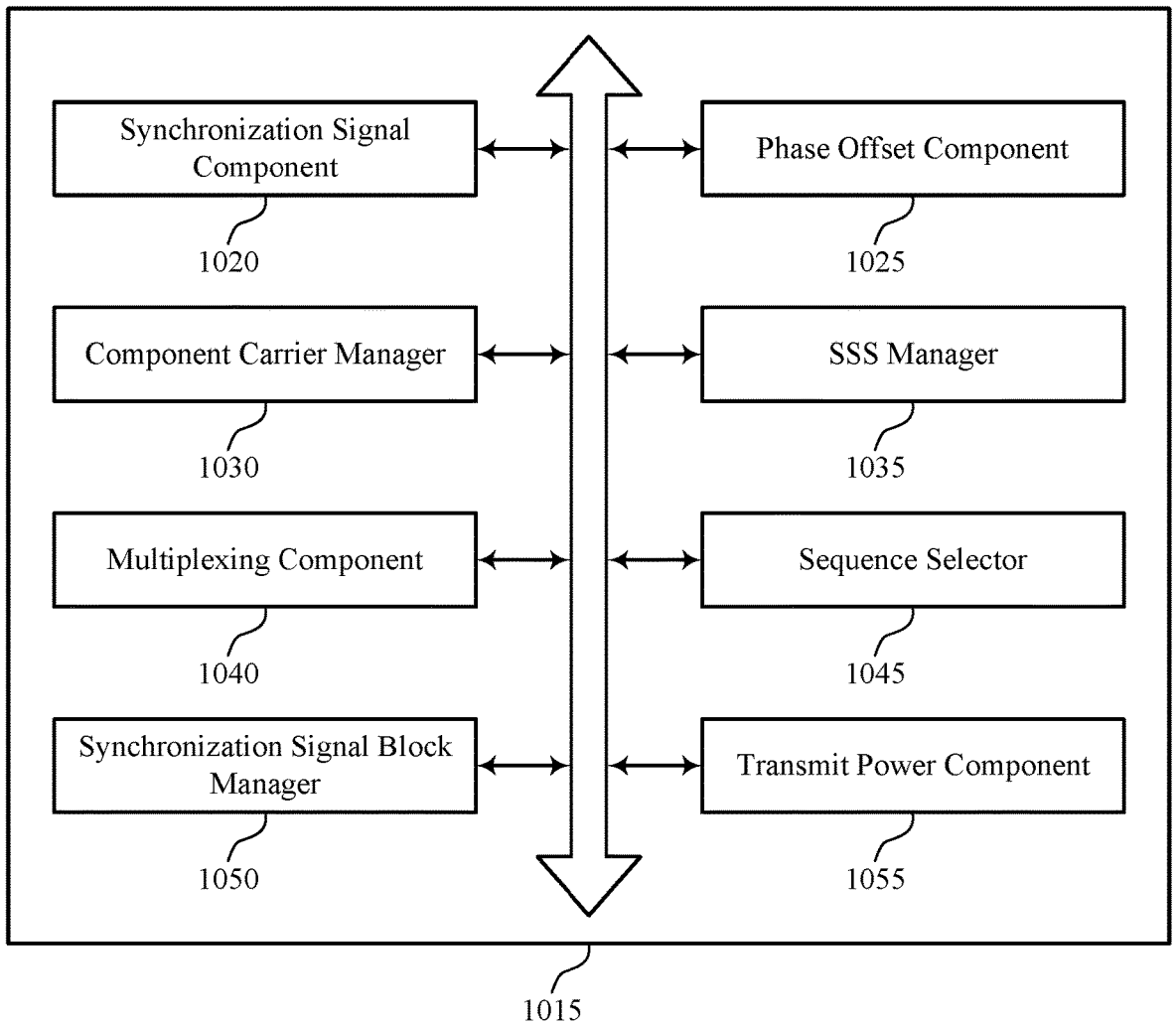

FIG. 10 shows a block diagram 1000 of a synchronization signal manager 1015 that supports synchronization signal transmission techniques for PAPR reduction in accordance with various aspects of the present disclosure. The synchronization signal manager 1015 may be an example of aspects of a synchronization signal manager 815, a synchronization signal manager 915, or a synchronization signal manager 1115 described with reference to FIGS. 8, 9, and 11. The synchronization signal manager 1015 may include synchronization signal component 1020, phase offset component 1025, component carrier manager 1030, SSS manager 1035, multiplexing component 1040, sequence selector 1045, synchronization signal block manager 1050, and transmit power component 1055. Each of these modules may communicate, directly or indirectly, with one another (e.g., via one or more buses).

Synchronization signal manager 1015 and/or at least some of its various sub-components may be implemented in hardware, software executed by a processor, firmware, or any combination thereof. If implemented in software executed by a processor, the functions of the synchronization signal manager 1015 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure.

The synchronization signal manager 1015 and/or at least some of its various sub-components may be physically located at various positions, including being distributed such that portions of functions are implemented at different physical locations by one or more physical devices. In some examples, synchronization signal manager 1015 and/or at least some of its various sub-components may be a separate and distinct component in accordance with various aspects of the present disclosure. In other examples, synchronization signal manager 1015 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Synchronization signal component 1020 may identify a set of synchronization signals. In some cases, each synchronization signal may be associated with a different component carrier of a set of component carriers. In some examples, the set of synchronization signals includes PSSs, or SSSs, or a combination thereof. In some cases, each synchronization signal of the set of synchronization signal is associated with a same sequence. In some examples, synchronization signal component 1020 may identify a set of synchronization signal blocks. In some cases, each synchronization signal block includes at least one or more of a PSS, a SSS, a PBCH, and a DMRS of the PBCH.

Phase offset component 1025 may select a phase offset from a set of phase offsets for each synchronization signal of the set of synchronization signals and may identify the set of phase offsets based on a number of component carriers of the set of component carriers, or a sequence of the synchronization signals associated with the different component carriers of the set of component carriers, or both. In some examples, phase offset component 1025 may identify a PAPR or a CM associated with the set of phase offsets, where identifying the set of phase offsets is based on minimizing the identified PAPR or the identified CM. Additionally or alternatively, phase offset component 1025 may identify a PAPR or a CM associated with the set of phase offsets, where identifying the set of phase offsets is based on whether the identified PAPR or the identified CM is less than a predetermined threshold. In some cases, selecting the phase offset includes applying a phase ramp across the synchronization signals each associated with the different component carriers of the set of component carriers.

In some cases, selecting the phase offset includes applying a sequence across different component carriers of a set of component carriers. The sequence may include a short Zadoff-Chu sequence, or an extended Zadoff-Chu sequence, or a short M sequence, or an extended M sequence. In some examples, selecting the phase offset includes applying a short Zadoff-Chu sequence across the different component carriers of the set of component carriers. In some cases, selecting the phase offset includes applying an extended Zadoff-Chu sequence across the different component carriers of the set of component carriers.

Component carrier manager 1030 may transmit each synchronization signal on one or more component carriers of a set of component carriers using the selected phase offset. In some examples, component carrier manager 1030 may transmit the set of synchronization signals using the selected phase offsets, the set of synchronization signals being simultaneously transmitted using FDM. In some cases, transmitting the set of synchronization signals includes transmitting each synchronization signal on one or more component carriers of a set of component carriers. In some examples, transmitting each synchronization signal on the different component carriers includes transmitting each synchronization signal in a different radio frequency band. In some cases, transmitting the set of synchronization signals includes transmitting the set of synchronization signals simultaneously in a frequency domain within a wideband carrier.

Additionally or alternatively, component carrier manager 1030 may transmit each synchronization signal block of the set of synchronization signal blocks, each synchronization signal block being transmitted on one or more component carriers of a set of component carriers or transmitted simultaneously on a wideband carrier. In some cases, transmitting each synchronization signal on one or more component carriers includes transmitting each synchronization signal in a different frequency band. In some cases, transmitting each synchronization signal includes transmitting each synchronization signal on different component carriers of a set of component carriers, where each synchronization signal may be associated with a different component carrier of the set of component carriers. In some cases, transmitting each synchronization signal block includes refraining from transmitting another signal while transmitting each synchronization signal block. Additionally or alternatively, transmitting each synchronization signal block includes refraining from transmitting a data signal while transmitting each synchronization signal block.

In some examples, transmitting each synchronization signal block includes transmitting each synchronization signal block using a different antenna port of the base station or using a same antenna port of the base station. In some cases, transmitting each synchronization signal block on the one or more component carriers includes transmitting each synchronization signal block on different component carriers of the set of component carriers, each synchronization signal block associated with a different component carrier of the set of component carriers. In some examples, transmitting each synchronization signal block includes transmitting each synchronization signal block using a first beam configuration having a first width greater than a second width of a second beam configuration, the second beam configuration associated with transmitting a synchronization signal block over multiple component carriers of the set of component carriers from a same antenna port. In some cases, the first beam configuration is based at least in part on a plurality of beam directions. In some examples, transmitting each synchronization signal block includes refraining from transmitting another signal while transmitting each synchronization signal block.

SSS manager 1035 may identify a set of SSSs. Multiplexing component 1040 may multiplex each PSS and each SSS of a set of synchronization signals using time division multiplexing. Sequence selector 1045 may select one or more sequences for the set of synchronization signals. In some cases, the one or more sequences may include a Zadoff-Chu sequence, or a M sequence, or a combination thereof. In some cases, selecting the Zadoff-Chu sequence includes selecting a root and a base sequence length of the Zadoff-Chu sequence that minimizes a PAPR or a CM. In some cases, selecting the Zadoff-Chu sequence includes selecting a root and a base sequence length of the Zadoff-Chu sequence that corresponds to a PAPR value or a CM value that is below a predetermined threshold. In some cases, selecting the one or more sequences includes selecting one or more combinations of a root and a cyclic shift of a Zadoff-Chu sequence that minimizes a PAPR or a CM; or selecting one or more combinations of a polynomial and a cyclic shift of an M sequence that minimized the PAPR or the CM. In some examples, selecting the one or more sequences includes selecting one or more combinations of a root and a cyclic shift of a Zadoff-Chu sequence that corresponds to a PAPR value or a CM value that is below a predetermined threshold; or selecting one or more combinations of a polynomial and a cyclic shift of an M sequence that corresponds to a PAPR value or a CM value that is below a predetermined threshold.

Synchronization signal block manager 1050 may generate a synchronization signal block corresponding to the different antenna port, transmit the synchronization signal block in one or more component carriers of the set of component carriers from the different antenna port. Synchronization signal block manager 1050 may also identify an indication of an antenna port associated with the component carriers, or a selected transmission beam, or both, where transmitting the synchronization signal block includes transmitting the indication. In some cases, synchronization signal block manager 1050 may transmit a synchronization signal block using the selected phase offset, where the synchronization signal block includes at least one or more of a PSS, an SSS, and a PBCH Transmit power component 1055 may identify a first transmit power greater than a second transmit power, the second transmit power associated with transmitting a synchronization signal block over multiple component carriers of the set of component carriers from a same antenna port, where transmitting each synchronization signal block in one or more component carriers of the set of component carriers from the different antenna port includes using the first transmit power.

Figure 11:
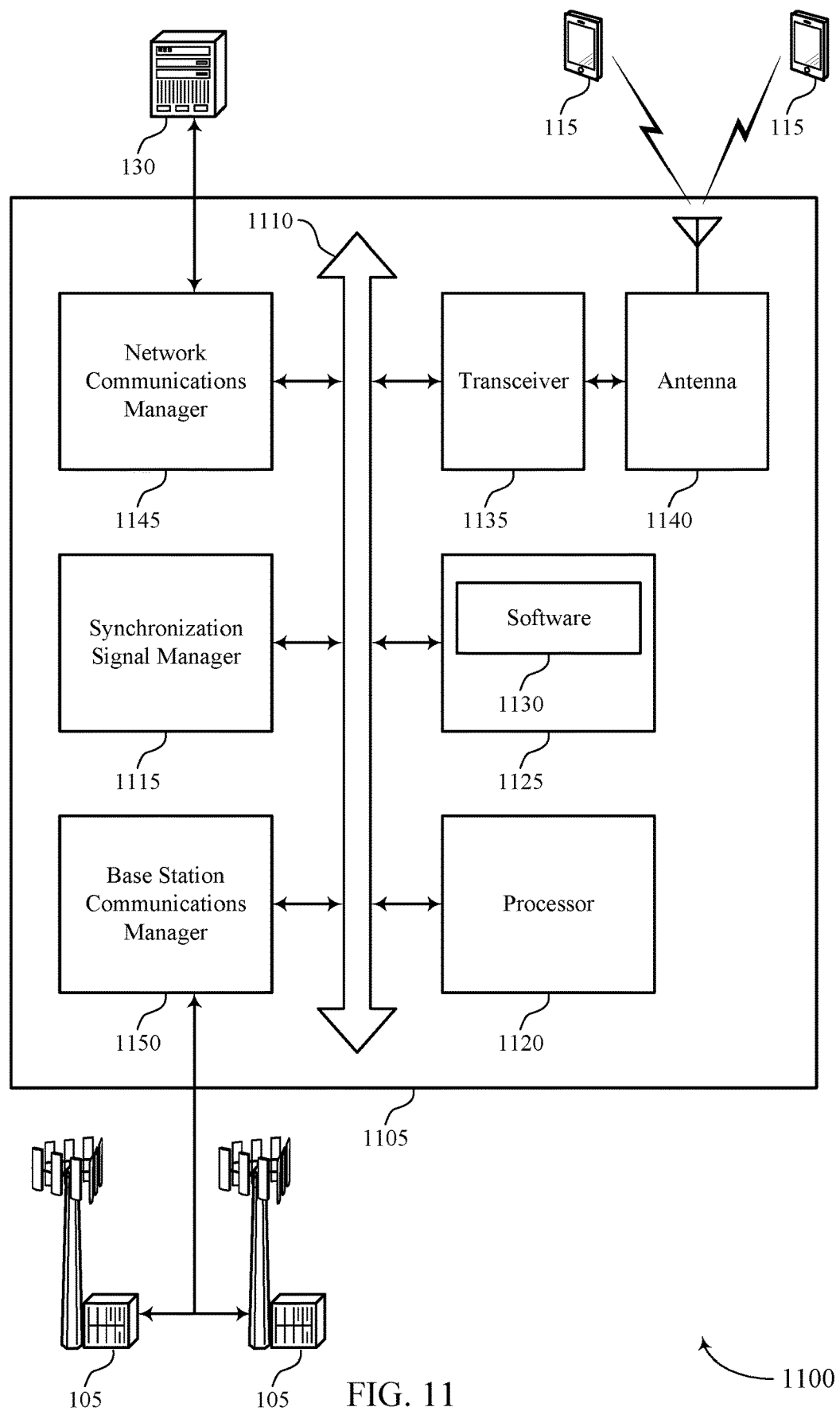
FIG. 11 illustrates a block diagram of a system including a device that supports synchronization signal transmission techniques for PAPR reduction in accordance with aspects of the present disclosure.

FIG. 11 shows a diagram of a system 1100 including a device 1105 that supports synchronization signal transmission techniques for PAPR reduction in accordance with various aspects of the present disclosure. Device 1105 may be an example of or include the components of wireless device 805, wireless device 905, or a base station 105 as described with reference to FIGS. 1, 8 and 9. Device 1105 may include components for bi-directional voice and data communications including components for transmitting and receiving communications, including synchronization signal manager 1115, processor 1120, memory 1125, software 1130, transceiver 1135, antenna 1140, network communications manager 1145, and base station communications manager 1150. These components may be in electronic communication via one or more busses (e.g., bus 1110). Device 1105 may communicate wirelessly with one or more UEs 115.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting synchronization signal transmission techniques for PAPR reduction).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support synchronization signal transmission techniques for PAPR reduction. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions. Network communications manager 1145 may manage communications with the core network (e.g., via one or more wired backhaul links). For example, the network communications manager 1145 may manage the transfer of data communications for client devices, such as one or more UEs 115.

Network communications manager 1145 and/or at least some of its various sub-components may be implemented in hardware, software executed by a processor, firmware, or any combination thereof. If implemented in software executed by a processor, the functions of the network communications manager 1145 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure.

The network communications manager 1145 and/or at least some of its various sub-components may be physically located at various positions, including being distributed such that portions of functions are implemented at different physical locations by one or more physical devices. In some examples, network communications manager 1145 and/or at least some of its various sub-components may be a separate and distinct component in accordance with various aspects of the present disclosure. In other examples, network communications manager 1145 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Base station communications manager 1150 may manage communications with other base stations 105, and may include a controller or scheduler for controlling communications with UEs 115 in cooperation with other base stations 105. For example, the base station communications manager 1150 may coordinate scheduling for transmissions to UEs 115 for various interference mitigation techniques such as beamforming or joint transmission. In some examples, base station communications manager 1150 may provide an X2 interface within an LTE/LTE-A wireless communication network technology to provide communication between base stations 105.

Base station communications manager 1150 and/or at least some of its various sub-components may be implemented in hardware, software executed by a processor, firmware, or any combination thereof. If implemented in software executed by a processor, the functions of the base station communications manager 1150 and/or at least some of its various sub-components may be executed by a general-purpose processor, DSP, an ASIC, a FPGA or other programmable logic device, discrete gate or transistor logic, discrete hardware components, or any combination thereof designed to perform the functions described in the present disclosure.

The base station communications manager 1150 and/or at least some of its various sub-components may be physically located at various positions, including being distributed such that portions of functions are implemented at different physical locations by one or more physical devices. In some examples, base station communications manager 1150 and/or or at least some of its various sub-components may be a separate and distinct component in accordance with various aspects of the present disclosure. In other examples, base station communications manager 1150 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Figure 12:
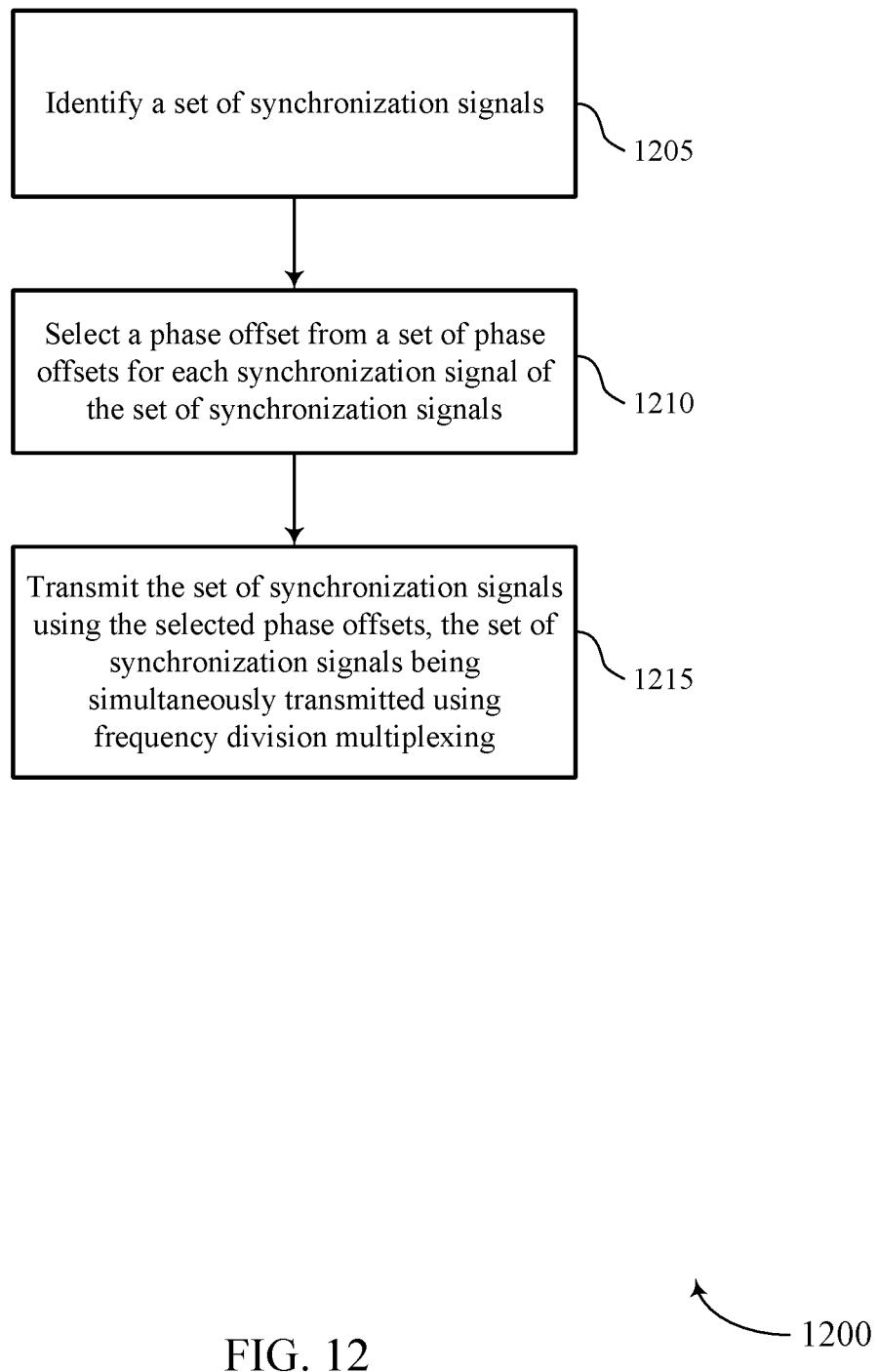
FIGS. 12 through 16 illustrate methods for synchronization signal transmission techniques for PAPR reduction in accordance with aspects of the present disclosure.

FIG. 12 shows a flowchart illustrating a method 1200 for synchronization signal transmission techniques for PAPR reduction in accordance with various aspects of the present disclosure. The operations of method 1200 may be implemented by a base station 105 or its components as described herein. For example, the operations of method 1200 may be performed by a synchronization signal manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1205 the base station 105 may identify a set of synchronization signals. The operations of block 1205 may be performed according to the methods described with reference to FIGS. 1 through 7. In certain examples, aspects of the operations of block 1205 may be performed by a synchronization signal component as described with reference to FIGS. 8 through 11.

At block 1210 the base station 105 may select a phase offset from a set of phase offsets for each synchronization signal of the set of synchronization signals. The operations of block 1210 may be performed according to the methods described with reference to FIGS. 1 through 7. In certain examples, aspects of the operations of block 1210 may be performed by a phase offset component as described with reference to FIGS. 8 through 11.

At block 1215 the base station 105 may transmit the set of synchronization signals using the selected phase offsets, the set of synchronization signals being simultaneously transmitted using frequency division multiplexing. The operations of block 1215 may be performed according to the methods described with reference to FIGS. 1 through 7. In certain examples, aspects of the operations of block 1215 may be performed by a component carrier manager as described with reference to FIGS. 8 through 11.

Figure 13:
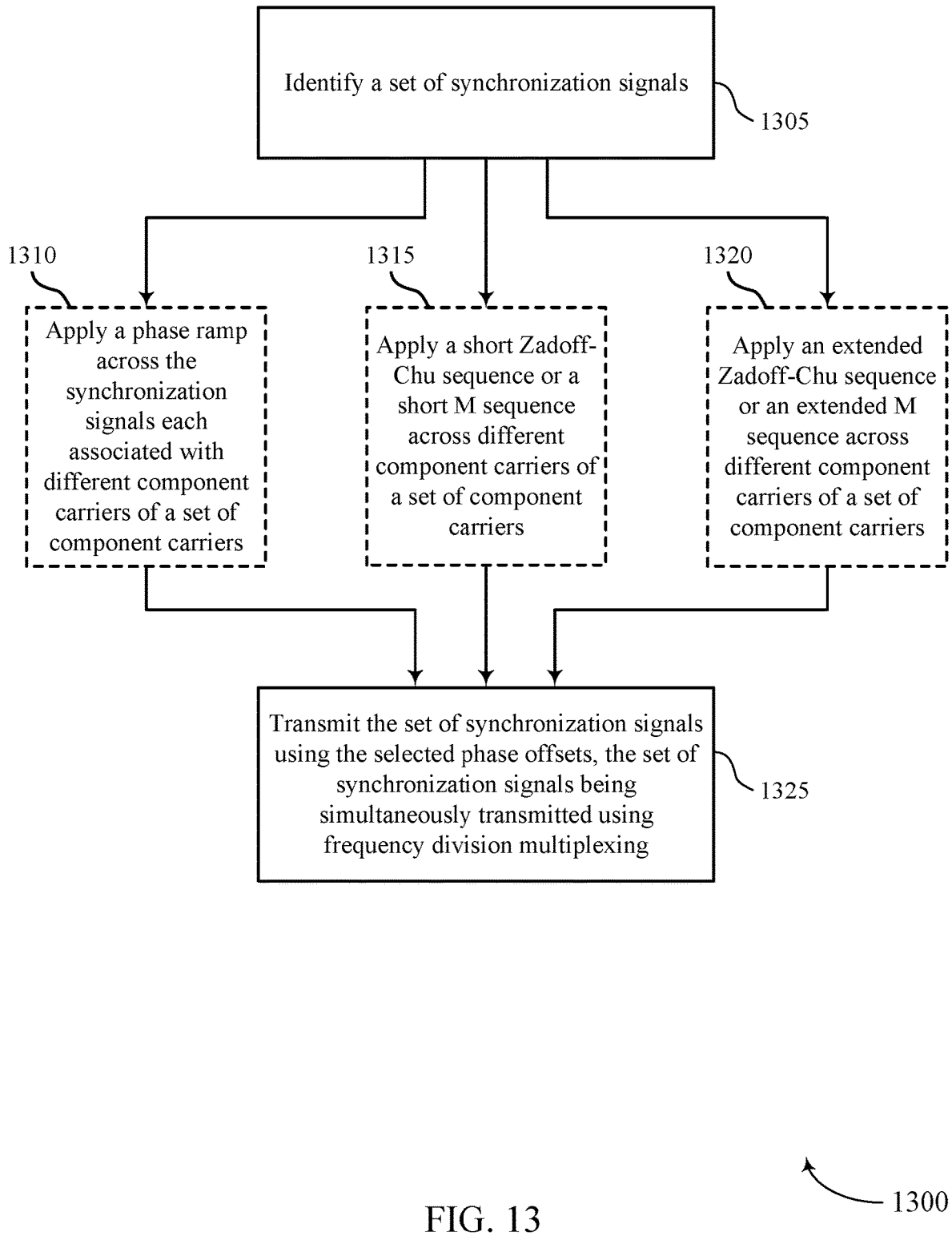

FIG. 13 shows a flowchart illustrating a method 1300 for synchronization signal transmission techniques for PAPR reduction in accordance with various aspects of the present disclosure. The operations of method 1300 may be implemented by a base station 105 or its components as described herein. For example, the operations of method 1300 may be performed by a synchronization signal manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1305 the base station 105 may identify a set of synchronization signals. The operations of block 1305 may be performed according to the methods described with reference to FIGS. 1 through 7. In certain examples, aspects of the operations of block 1305 may be performed by a synchronization signal component as described with reference to FIGS. 8 through 11.

After identifying the set of synchronization signals, the base station 105 may select a phase offset from a set of phase offsets for each synchronization signal of the set of synchronization signals. In some examples, the base station 105 may use various techniques to select the phase offset. For instance, at block 1310 the base station may optionally select the phase offset by applying a phase ramp across the synchronization signals each associated with different component carriers of a set of component carriers. The operations of block 1310 may be performed according to the methods described with reference to FIGS. 1 through 7. In certain examples, aspects of the operations of block 1310 may be performed by a phase offset component as described with reference to FIGS. 8 through 11.

At block 1315, the base station 105 may optionally select the phase offset by applying a short Zadoff-Chu sequence or a short M sequence across the different component carriers of the set of component carriers. The operations of block 1315 may be performed according to the methods described with reference to FIGS. 1 through 7. In certain examples, aspects of the operations of block 1315 may be performed by a phase offset component as described with reference to FIGS. 8 through 11.

Additionally or alternatively, the base station 105 may optionally select the phase offset by applying an extended Zadoff-Chu sequence or an extended M sequence across the different component carriers of the set of component carriers at block 1320. The operations of block 1320 may be performed according to the methods described with reference to FIGS. 1 through 7. In certain examples, aspects of the operations of block 1320 may be performed by a phase offset component as described with reference to FIGS. 8 through 11.

At block 1325 the base station 105 may transmit the set of synchronization signals using the selected phase offsets, the set of synchronization signals being simultaneously transmitted using frequency division multiplexing. The operations of block 1325 may be performed according to the methods described with reference to FIGS. 1 through 7. In certain examples, aspects of the operations of block 1325 may be performed by a component carrier manager as described with reference to FIGS. 8 through 11.

Figure 14:
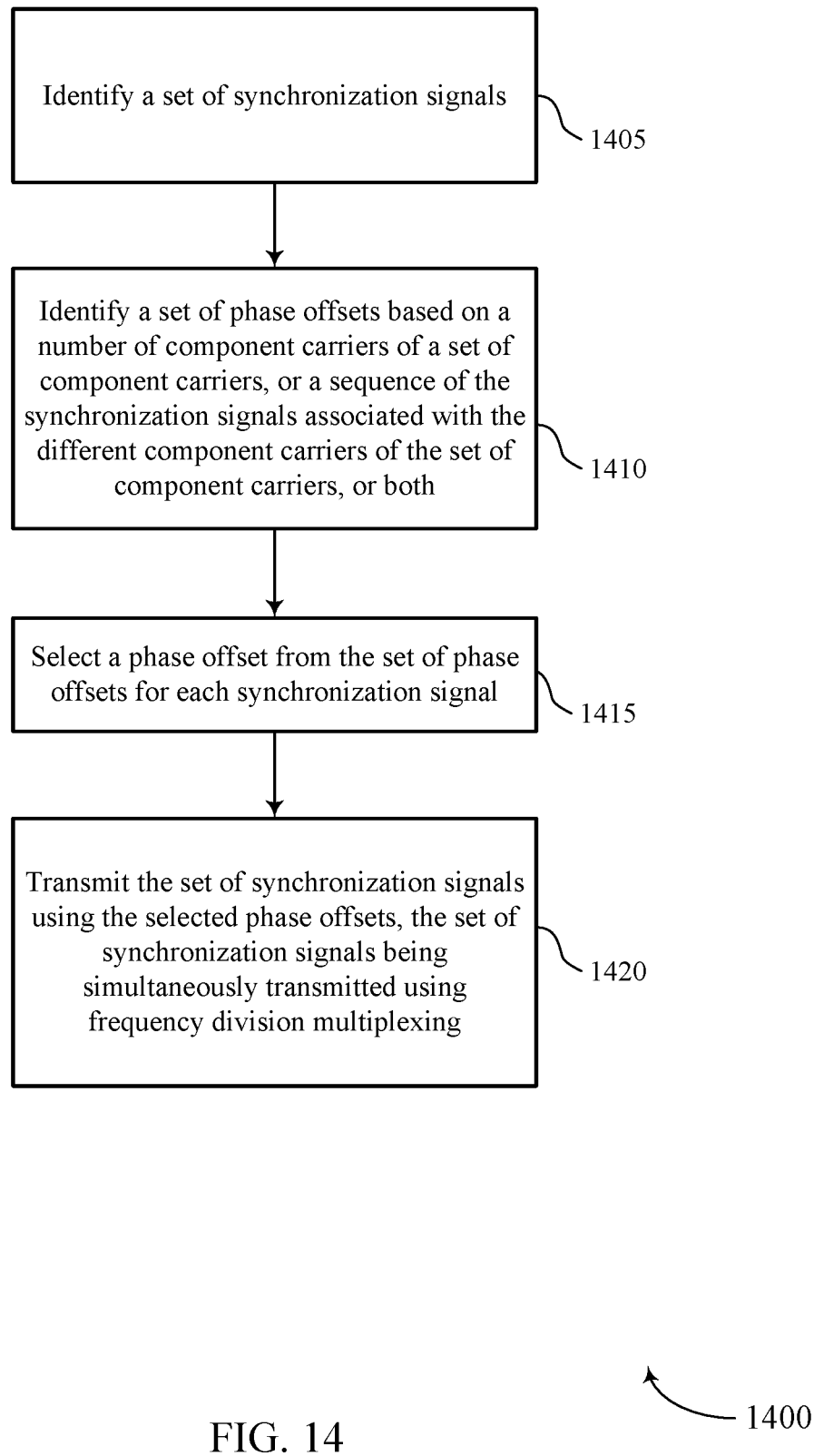

FIG. 14 shows a flowchart illustrating a method 1400 for synchronization signal transmission techniques for PAPR reduction in accordance with various aspects of the present disclosure. The operations of method 1400 may be implemented by a base station 105 or its components as described herein. For example, the operations of method 1400 may be performed by a synchronization signal manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1405 the base station 105 may identify a set of synchronization signals. The operations of block 1405 may be performed according to the methods described with reference to FIGS. 1 through 7. In certain examples, aspects of the operations of block 1405 may be performed by a synchronization signal component as described with reference to FIGS. 8 through 11.

At block 1410 the base station 105 may identify a set of phase offsets based at least in part on a number of component carriers of a set of component carriers, or a sequence of the synchronization signals associated with different component carriers of the set of component carriers, or both. The operations of block 1410 may be performed according to the methods described with reference to FIGS. 1 through 7. In certain examples, aspects of the operations of block 1410 may be performed by a phase offset component as described with reference to FIGS. 8 through 11.

At block 1415 the base station 105 may select a phase offset from a set of phase offsets for each synchronization signal. The operations of block 1415 may be performed according to the methods described with reference to FIGS. 1 through 7. In certain examples, aspects of the operations of block 1415 may be performed by a phase offset component as described with reference to FIGS. 8 through 11.

At block 1420 the base station 105 may transmit the set of synchronization signals using the selected phase offsets, the set of synchronization signals being simultaneously transmitted using frequency division multiplexing. The operations of block 1420 may be performed according to the methods described with reference to FIGS. 1 through 7. In certain examples, aspects of the operations of block 1420 may be performed by a component carrier manager as described with reference to FIGS. 8 through 11.

Figure 15:
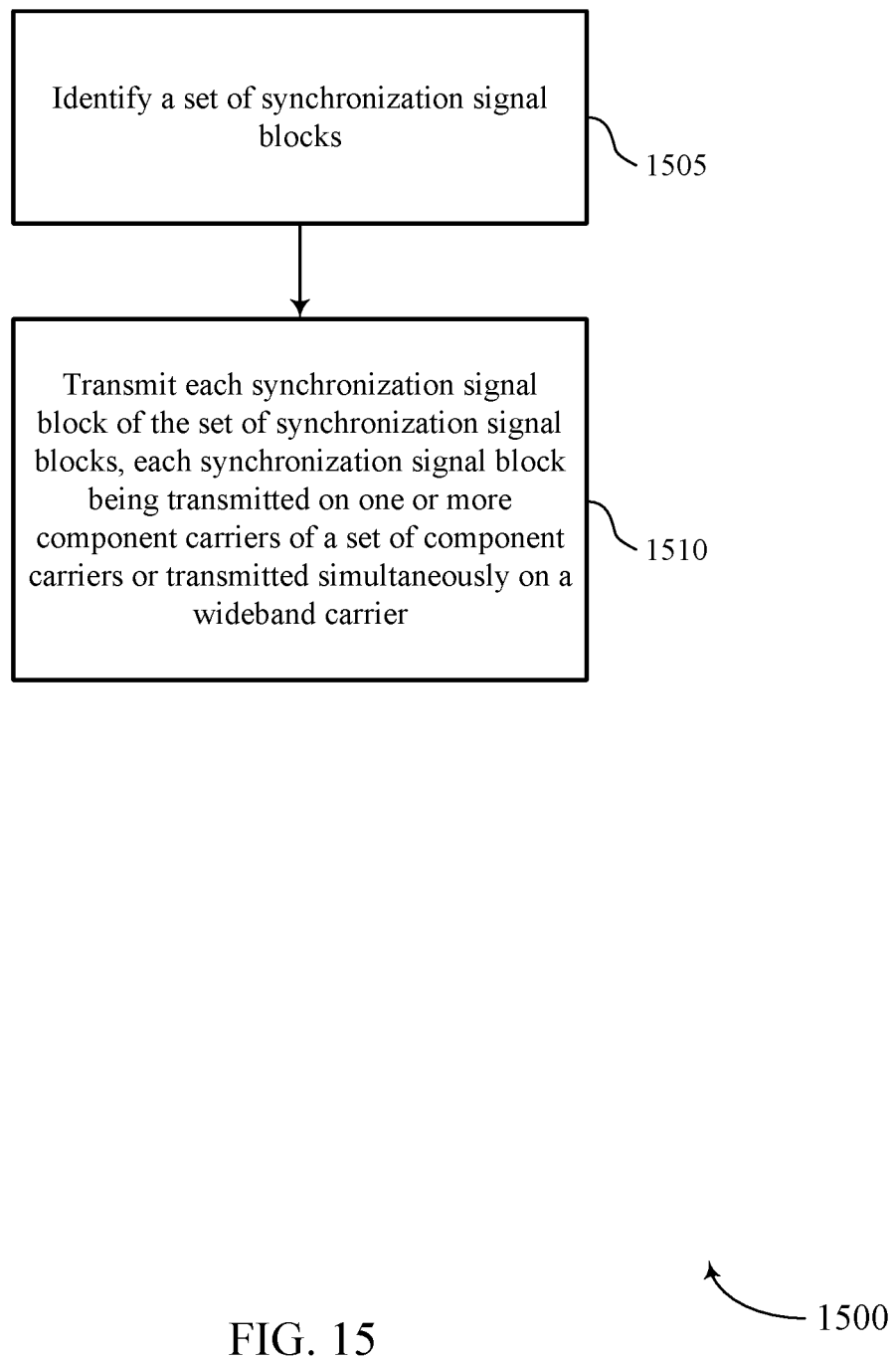

FIG. 15 shows a flowchart illustrating a method 1500 for synchronization signal transmission techniques for PAPR reduction in accordance with various aspects of the present disclosure. The operations of method 1500 may be implemented by a base station 105 or its components as described herein. For example, the operations of method 1500 may be performed by a synchronization signal manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1505 the base station 105 may identify a set of synchronization signal blocks. The operations of block 1505 may be performed according to the methods described with reference to FIGS. 1 through 7. In certain examples, aspects of the operations of block 1505 may be performed by a synchronization signal component as described with reference to FIGS. 8 through 11.

At block 1510 the base station 105 may transmit each synchronization signal block of the set of synchronization signal blocks, each synchronization signal block being transmitted on one or more component carriers of a set of component carriers or transmitted simultaneously on a wideband carrier. The operations of block 1510 may be performed according to the methods described with reference to FIGS. 1 through 7. In certain examples, aspects of the operations of block 1510 may be performed by a component carrier manager as described with reference to FIGS. 8 through 11.

Figure 16:
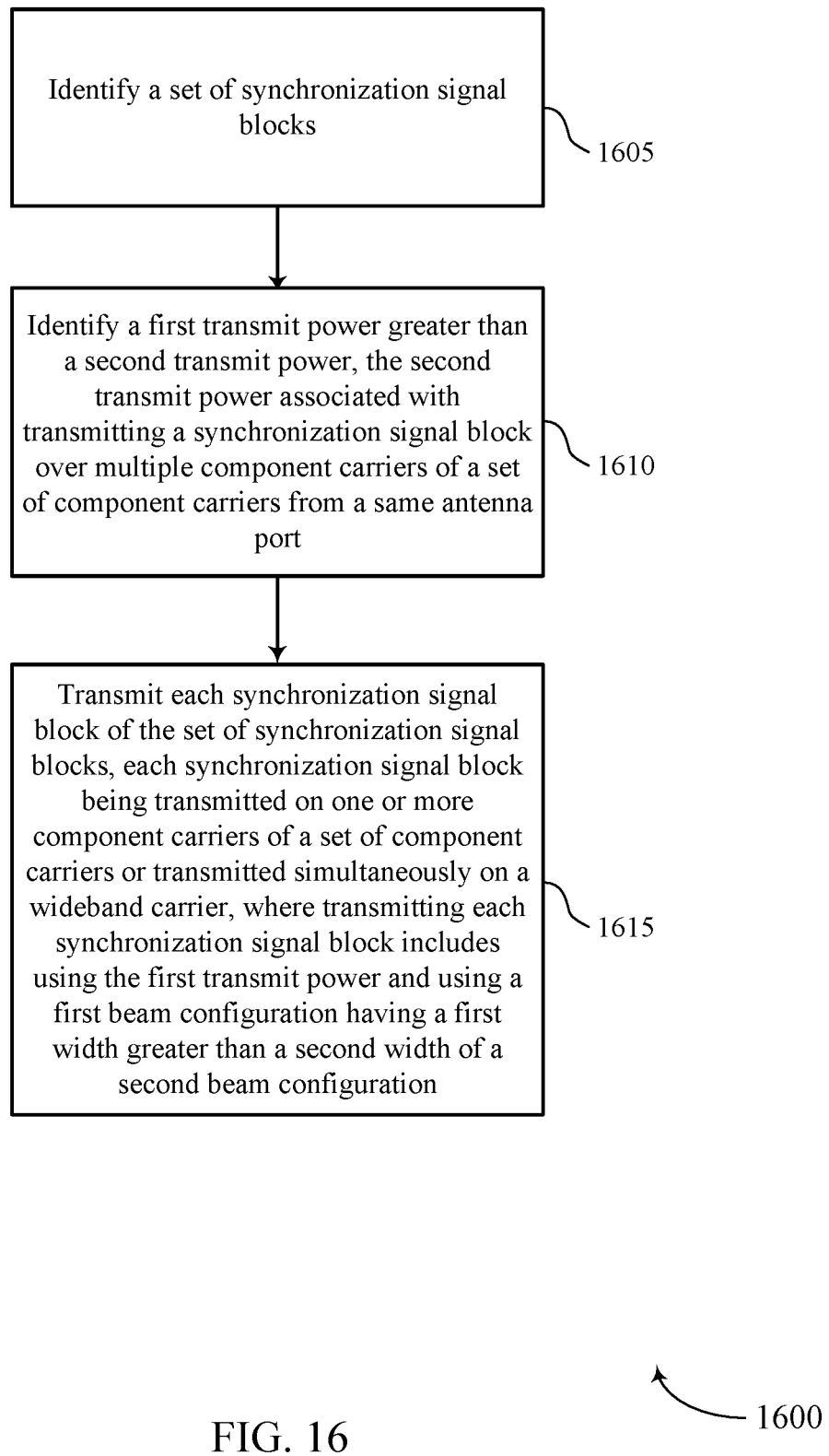

FIG. 16 shows a flowchart illustrating a method 1600 for synchronization signal transmission techniques for PAPR reduction in accordance with various aspects of the present disclosure. The operations of method 1600 may be implemented by a base station 105 or its components as described herein. For example, the operations of method 1600 may be performed by a synchronization signal manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1605 the base station 105 may identify a set of synchronization signal blocks. The operations of block 1605 may be performed according to the methods described with reference to FIGS. 1 through 7. In certain examples, aspects of the operations of block 1605 may be performed by a synchronization signal component as described with reference to FIGS. 8 through 11.

At block 1610 the base station 105 may identify a first transmit power greater than a second transmit power, the second transmit power associated with transmitting a synchronization signal block over multiple component carriers of a set of component carriers from a same antenna port. The operations of block 1610 may be performed according to the methods described with reference to FIGS. 1 through 7. In certain examples, aspects of the operations of block 1610 may be performed by a transmit power component as described with reference to FIGS. 8 through 11.

At block 1615 the base station 105 may transmit each synchronization signal block of the set of synchronization signal blocks, each synchronization signal block being transmitted on one or more component carriers of a set of component carriers or transmitted simultaneously on a wideband carrier, where transmitting each synchronization signal block includes using the first transmit power and using a first beam configuration having a first width greater than a second width of a second beam configuration. In some examples, the first beam configuration is based at least in part on a plurality of beam directions. Additionally, the second beam configuration may be associated with transmitting a synchronization signal block over multiple component carriers of the set of component carriers from a same antenna port. The operations of block 1615 may be performed according to the methods described with reference to FIGS. 1 through 7. In certain examples, aspects of the operations of block 1615 may be performed by a component carrier manager as described with reference to FIGS. 8 through 11.

In some examples, aspects from two or more of the methods 1200, 1300, 1400, 1500, or 1600 described with reference to FIGS. 12 through 16 may be combined. It should be noted that the methods 1200, 1300, 1400, 1500, and 1600 are just example implementations, and that the operations of the methods 1200, 1300, 1400, 1500, or 1600 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
   identifying a set of synchronization signals;
   selecting a phase offset from a set of phase offsets for each synchronization signal of the set of synchronization signals; and
   transmitting the set of synchronization signals using the selected phase offsets, wherein a first synchronization signal of the set of synchronization signals is phase shifted according to a first phase offset and a second synchronization signal of the set of synchronization signals is phase shifted according to a second phase offset, the set of synchronization signals being simultaneously transmitted using frequency division multiplexing.

2. The method of claim 1, wherein transmitting the set of synchronization signals comprises:
   transmitting each synchronization signal on one or more component carriers of a set of component carriers.

3. The method of claim 2, wherein transmitting each synchronization signal on the one or more component carriers comprises:
   transmitting each synchronization signal on different component carriers of the set of component carriers, each synchronization signal associated with a different component carrier of the set of component carriers.

4. The method of claim 3, wherein transmitting each synchronization signal on the different component carriers comprises:
   transmitting each synchronization signal in a different radio frequency band.

5. The method of claim 1, wherein transmitting the set of synchronization signals comprises:
   transmitting the set of synchronization signals simultaneously in a frequency domain within a wideband carrier.

6. The method of claim 1, wherein the set of synchronization signals comprises primary synchronization signals (PSSs), or secondary synchronization signals (SSSs), or a combination thereof.

7. The method of claim 6, further comprising:
   multiplexing each PSS and each SSS of the set of synchronization signals using time division multiplexing.

8. The method of claim 1, wherein selecting the phase offset comprises:
   applying a phase ramp across the set of synchronization signals, each synchronization signal being associated with different component carriers of a set of component carriers.

9. The method of claim 1, wherein selecting the phase offset comprises:
   applying a sequence across different component carriers of a set of component carriers.

10. The method of claim 9, wherein the sequence comprises a short Zadoff-Chu sequence, or an extended Zadoff-Chu sequence, or a short maximum length (M) sequence, or an extended M sequence.

11. The method of claim 1, further comprising:
    identifying the set of phase offsets based at least in part on a number of component carriers of a set of component carriers, or a sequence of synchronization signals associated with different component carriers of the set of component carriers, or both.

12. The method of claim 11, further comprising:
    identifying a peak-to-average power ratio (PAPR) or a cubic metric (CM) associated with the set of phase offsets, wherein identifying the set of phase offsets is based at least in part on minimizing the identified PAPR or the identified CM.

13. The method of claim 11, further comprising:
    identifying a peak-to-average power ratio (PAPR) or a cubic metric (CM) associated with the set of phase offsets, wherein identifying the set of phase offsets is based at least in part on whether the identified PAPR or the identified CM is less than a predetermined threshold.

14. The method of claim 1, further comprising:
    selecting one or more sequences for the set of synchronization signals.

15. The method of claim 14, wherein the one or more sequences comprise a Zadoff-Chu sequence, or a maximum length (M) sequence, or a combination thereof.

16. The method of claim 14, wherein selecting the one or more sequences comprises:
    selecting one or more combinations of a root and a cyclic shift of a Zadoff-Chu sequence that minimizes a peak-to-average power ratio (PAPR) or a cubic metric (CM); or
    selecting one or more combinations of a polynomial and a cyclic shift of a maximum length (M) sequence that minimized the PAPR or the CM.

17. The method of claim 14, wherein selecting the one or more sequences comprises:
    selecting one or more combinations of a root and a cyclic shift of a Zadoff-Chu sequence that corresponds to a peak-to-average power ratio (PAPR) value or a cubic metric (CM) value that is below a predetermined threshold; or
    selecting one or more combinations of a polynomial and a cyclic shift of a maximum length (M) sequence that corresponds to a PAPR value or a CM value that is below a predetermined threshold.

18. The method of claim 1, further comprising:
    transmitting a synchronization signal block using the selected phase offsets, wherein the synchronization signal block comprises at least one or more of a PSS, an SSS, a physical broadcast channel (PBCH), and a demodulation reference signal (DMRS) of the PBCH.

19. An apparatus for wireless communication at a base station, in a system comprising:
    a processor;
    memory in electronic communication with the processor; and
    instructions stored in the memory and operable, when executed by the processor, to cause the apparatus to:
    identify a set of synchronization signals;

select a phase offset from a set of phase offsets for each synchronization signal of the set of synchronization signals; and transmit the set of synchronization signals using the selected phase offsets, wherein a first synchronization signal of the set of synchronization signals is phase shifted according to a first phase offset and a second synchronization signal of the set of synchronization signals is phase shifted according to a second phase offset, the set of synchronization signals being simultaneously transmitted using frequency division multiplexing.

* * * * *